(12) United States Patent
Hashimoto et al.

(10) Patent No.: US 7,752,408 B2
(45) Date of Patent: Jul. 6, 2010

(54) ACCESS CONTROL APPARATUS AND ACCESS CONTROL METHOD

(75) Inventors: Hideyuki Hashimoto, Toyokawa (JP); Takeshi Hibino, Toyokawa (JP); Kazuyuki Kawabata, Toyokawa (JP); Kenichi Sawada, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 869 days.

(21) Appl. No.: 11/640,223

(22) Filed: Dec. 18, 2006

(65) Prior Publication Data
US 2007/0199055 A1    Aug. 23, 2007

(30) Foreign Application Priority Data
Feb. 18, 2006   (JP) .............................. 2006-041709

(51) Int. Cl.
G06F 12/00 (2006.01)
G06F 13/00 (2006.01)
G06F 13/28 (2006.01)
G06F 21/00 (2006.01)
G06F 7/04 (2006.01)
G06F 17/30 (2006.01)
H04N 7/16 (2006.01)

(52) U.S. Cl. .................. 711/164; 711/163; 713/182; 713/183; 713/184; 713/185; 726/26; 726/27; 726/28

(58) Field of Classification Search .................. 711/164
See application file for complete search history.

(56) References Cited

U.S. PATENT DOCUMENTS 7,428,642 B2 * 9/2008 Osaki ........................ 713/189

2005/0039026 A1 * 2/2005 Schull ........................ 713/183
2005/0204174 A1 * 9/2005 Bates et al. ................. 713/202
2006/0075476 A1 * 4/2006 Hajji et al. ..................... 726/6
2007/0016804 A1 * 1/2007 Kemshall .................... 713/193
2007/0050587 A1 * 3/2007 Palapudi et al. ............. 711/164

FOREIGN PATENT DOCUMENTS

| JP | 5-143430 A | 6/1993 |
| JP | 7-184068 A | 7/1995 |
| JP | 11-112754 A | 4/1999 |
| JP | 2003-058657 A | 2/2003 |
| JP | 2003-271437 A | 9/2003 |

* cited by examiner

*Primary Examiner*—Brian R Peugh
*Assistant Examiner*—Ryan Bertram
(74) *Attorney, Agent, or Firm*—Buchanan Ingersoll & Rooney PC

(57) ABSTRACT

Disclosed is an access control apparatus controls access to a storage device and includes an access password input device that receives an input of an access password; an access control information acquiring unit that acquires access control information indicating an access password to be inputted for access; an access controller that controls access to a file stored in a file storage region, based on the inputted access password and the access control information, wherein the access controller is operable when different region access passwords are set for accessing a first file storage region and a second file storage region, respectively, to control access after a file stored in the first file storage region has been transported to the second file storage region so that at least one password that could be used to access the file in the first file storage region is inherited after transportation.

19 Claims, 31 Drawing Sheets

Fig. 4

| BOX | DEFAULT PASSWORD | ADDED PASSWORD |
|---|---|---|
| BOX A | 001 | |
| BOX B | 002 | |
| BOX C | 003 | |
| ... | ... | |

Fig. 5

| FILE | BOX | DEFAULT PASSWORD | ADDED PASSWORD |
|------|-----|------------------|----------------|
| FILE A1 | BOX A | 001 | |
| FILE A2 | BOX A | 001 | |
| FILE A3 | BOX A | 001 | |
| FILE B1 | BOX B | 002 | |
| FILE B2 | BOX B | 002 | |
| FILE C1 | BOX C | 003 | |
| ... | ... | ... | |

Fig. 13A

| FILE | BOX | DEFAULT PASSWORD | ADDED PASSWORD |
|---|---|---|---|
| FILE A1 | BOX A | 001 | |
| FILE A1 | BOX B | 001 | 001 |
| ⋮ | ⋮ | ⋮ | ⋮ |

Fig. 13B

| FILE | BOX | DEFAULT PASSWORD | ADDED PASSWORD |
|---|---|---|---|
| FILE A1 | BOX A | 001 | |
| FILE A1 | BOX B | 001 | 001 |
| FILE A1 | BOX C | 001 | 001, 002 |
| ⋮ | ⋮ | ⋮ | ⋮ |

Fig. 13C

| FILE | BOX | DEFAULT PASSWORD | ADDED PASSWORD |
|---|---|---|---|
| FILE A1 | BOX A | 001 | |
| FILE A1 | BOX B | 001 | 001 |
| FILE A1 | BOX C | 001 | 002 |
| ⋮ | ⋮ | ⋮ | ⋮ |

Fig. 14A

| BOX | DEFAULT PASSWORD | ADDED PASSWORD |
|---|---|---|
| BOX A | 001 | |
| BOX B | 002 | 001 |
| BOX C | 003 | |
| ⋮ | ⋮ | ⋮ |

Fig. 14B

| BOX | DEFAULT PASSWORD | ADDED PASSWORD |
|---|---|---|
| BOX A | 001 | |
| BOX B | 002 | 001 |
| BOX C | 003 | 001, 002 |
| ⋮ | ⋮ | ⋮ |

Fig. 14C

| BOX | DEFAULT PASSWORD | ADDED PASSWORD |
|---|---|---|
| BOX A | 001 | |
| BOX B | 002 | 001 |
| BOX C | 003 | 002 |
| ⋮ | ⋮ | ⋮ |

Fig. 15A

| FILE | BOX | DEFAULT PASSWORD | ADDED PASSWORD |
|---|---|---|---|
| FILE A1 | BOX B | 001 | 001 |
| . . . | . . . | . . . | . . . |

Fig. 15B

| FILE | BOX | DEFAULT PASSWORD | ADDED PASSWORD |
|---|---|---|---|
| FILE A1 | BOX C | 001 | 001, 002 |
| . . . | . . . | . . . | . . . |

Fig. 15C

| FILE | BOX | DEFAULT PASSWORD | ADDED PASSWORD |
|---|---|---|---|
| FILE A1 | BOX A | 001 | |
| . . . | . . . | . . . | |

Fig. 19

```
CREATE DATE & TIME : 2005/12/24  12:30:25
CREATOR NAME : Konica Minolta Development Dept. A
MODIFIED DATE & TIME : 2005/12/25  15:23:12
MODIFIER NAME : Konica Minolta Development Dept. B
FILE SIZE : 2kbyte
LATEST ACCESS DATE & TIME : 2005/12/26  10:05:46
TRANSPORTATION DATE & TIME (1) : 2005/12/24  17:35:53
COPY SOURCE (1) : BOX A
COPY DESTINATION (1) : BOX B
```

Fig. 22

| USER ID | PRIORITY RANKING | USER PASSWORD |
|---|---|---|
| USER 1 | 1 | 0101 |
| | 2 | 0102 |
| | 3 | 0103 |
| USER 2 | 1 | 0201 |
| | 2 | 0202 |
| | 3 | 0203 |
| | 4 | 0204 |
| USER 3 | 1 | 0301 |
| ⋮ | ⋮ | ⋮ |

Fig. 27

| FILE | BOX | DEFAULT PASSWORD | ADDED PASSWORD |
|---|---|---|---|
| FILE A1 | BOX B | 001 | 001, 0101 |
| FILE A2 | BOX B | 001 | 001, 0101 |
| FILE A3 | BOX B | 001 | 001, 0101 |
| FILE A4 | BOX B | 001 | 001, 0101 |
| FILE A5 | BOX B | 001 | 001, 0101, 0102 |
| FILE A6 | BOX B | 001 | 001, 0101, 0102 |
| ... | ... | ... | ... |

USER1 ACCESSES BOX B WITH INPUTTING PASSWORD

INPUT PASSWORD 0102 (PRIORITY RANKING 2)

INPUT PASSWORD 0101 (PRIORITY RANKING 1)

DISPLAY FILEA5 AND FILE A6
↓
ACCESS TO FILEA5 AND FILE A6 IS PERMITTED

DISPLAY FILEA1 TO FILE A6
↓
ACCESS TO FILEA1 TO FILE A6 IS PERMITTED

Fig. 28

```
CREATE DATE & TIME : 2005/12/24  12:30:25
CREATOR NAME : Konica Minolta Development Dept. A
MODIFIED DATE & TIME : 2005/12/25  15:23:12
MODIFIER NAME : Konica Minolta Development Dept. B
FILE SIZE : 2kbyte
LATEST ACCESS DATE & TIME : 2005/12/26  10:05:46
DEFAULT BOX : BOX A
BOX DEFAULT PASSWORD : 001
TRANSPORTATION DATE & TIME (1) : 2005/12/24  17:35:53
COPY SOURCE (1) : BOX A
COPY DESTINATION (1) : BOX B
COPY INSTRUCTION USER (1) : USER 1
ADDED PASSWORD (1) : 001
ADDED USER PASSWORD (1) : 0101, 0102
TRANSPORTATION DATE & TIME (2) : 2005/12/25  17:45:15
MOVE SOURCE (2) : BOX B
MOVE DESTINATION (2) : BOX C
MOVE INSTRUCTION USER (2) : USER 2
ADDED PASSWORD (2) : 002
ADDED USER PASSWORD (2) : 0201
```

ACCESS CONTROL APPARATUS AND ACCESS CONTROL METHOD

This application is based on the Japanese Patent Application No. 2006-041709 filed on Feb. 18, 2006, the content of which is hereby incorporated by reference.

BACKGROUND OF THE INVENTION

1. Field of the Invention

The present invention relates to an access control apparatus and an access control method that control access to a storage device in which a plurality of file storage regions can be allocated, each of the regions is capable of storing a plurality of files.

2. Description of Related Art

Modern image forming apparatuses are equipped with a large-capacity storage device, such as a hard disk drive. A File storage region referred to as a "box", for example, can be allocated in such storage device. The "box" corresponds to a "directory" or a "folder" on a personal computer (PC).

A plurality of boxes can be provided separately for different users, for different themes, and for different uses, and it is possible to set password for each box separately to keep files stored in the boxes secure. A technique for setting storage passwords for individual boxes is disclosed in the Japanese Laid-Open Patent Publication No. H11-112754.

When a file has been moved or copied between boxes for which passwords have been set (hereinafter, the moving of files to other boxes (i.e., operations where the files do not remain in the original box) and copying of files (i.e., operations where the files remain in the original box) are collectively referred to as "transportation" in the present specification), to access the file after transportation, it is necessary to re-input the password of the box to which the file has been transported. When doing so, if the passwords of both boxes differ, the user will need to remember two passwords. In particular, as the number of boxes with different passwords increases, this can lead to a fall in operability.

SUMMARY OF THE INVENTION

The present invention was conceived in view of the problem described above and it is an object of the present invention to provide an access control apparatus and an access control method with improved operability.

To achieve the stated object, an access control apparatus according to the present invention controls access to a storage device containing a plurality of file storage regions that are respectively capable of storing a plurality of files, the access control apparatus including: an access password input device that receives an input of an access password; an access control information acquiring unit that acquires access control information indicating an access password to be inputted for accessing to a file stored in a file storage region in the case where a region access password is set for the file storage region; and an access controller that controls access to a file stored in a file storage region, based on the inputted access password and the access control information, wherein the access controller is operable when different region access passwords are set for accessing a first file storage region and a second file storage region, respectively, to control access after a file stored in the first file storage region has been moved or copied to the second file storage region so that at least one password that could be used to access the file in the first file storage region is inherited after the file has been moved or copied to the second file storage region.

Here, "inheritance" refers to access control that makes it possible after a file stored in the first file storage region has been moved or copied to the second file storage region to access the second file storage region and the file moved or copied to the second file storage region using at least one password that could be used to access the file stored in the first file storage region. With the construction according to the present invention, by inheriting passwords as described above, it is possible to reduce the user's need to remember passwords.

An access control method according to the present invention is a method of controlling access to a storage device containing a plurality of file storage regions that are respectively capable of storing a plurality of files, the access control method including the steps of: receiving an input of an access password; acquiring access control information indicating an access password to be inputted for accessing to a file stored in a file storage region in the case where a region access password is set for the file storage region; controlling access to a file stored in a file storage region, based on the inputted access password and the access control information; and controlling access to a file that has been moved or copied from a first file storage region to a second file storage region so that at least one password that could be used to access the file in the first file storage region is inherited when different region access passwords are set for accessing the first file storage region and the second file storage region, respectively.

A recording medium according to the present invention stores an access control program that causes a processor to execute the steps of: acquiring an input of an access password; acquiring access control information indicating an access password to be inputted for accessing to a file stored in a file storage region in the case where a region access password is set for the file storage region; controlling access to a file stored in a file storage region, based on the inputted access password and the access control information; and controlling access to a file that has been moved or copied from a first file storage region to a second file storage region so that at least one password that could be used to access the file in the first file storage region is inherited when different region access passwords are set for accessing the first file storage region and the second file storage region, respectively.

Note that the term "program" given above is not limited to a program that can be directly executed by a processor such as a CPU, and also includes a program in the form of a source program, a program that has been compressed, a program that has been encrypted, and the like.

In addition, when the "program" referred to above is realized using the functions of a general-purpose program such as an operating system (OS), in the scope of the present invention, the recording medium according to the present invention is not limited to including code that realizes such functions of the OS. Instead of including code for realizing the related functions, the access control program may cause a processor to execute a process using the functions of the OS.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 4 is a diagram showing one example of the content of a table storing access control information for each box.

FIG. 5 is a diagram showing one example of the content of a table storing access control information for each file.

FIGS. 13A to 13C are diagrams useful in explaining how access control information is updated when a file is copied.

FIGS. 14A to 14C are diagrams useful in explaining how access control information of boxes is updated.

FIGS. 15A to 15C are diagrams useful in explaining how access control information is updated when a file is moved.

FIG. 19 is a diagram showing one example of the content of property information of a file.

FIG. 22 is a diagram useful in explaining one example of the content of user passwords.

FIG. 27 is a diagram useful in explaining access control according to a third embodiment.

FIG. 28 is a diagram showing one example of the content of property information in a case where access control information is added to the property information of a file.

DETAILED DESCRIPTION OF THE PREFERRED EMBODIMENTS

Embodiments of the present invention will now be described with reference to the attached drawings.

Embodiment 1

(1) Construction of an MFP

Figure 1:
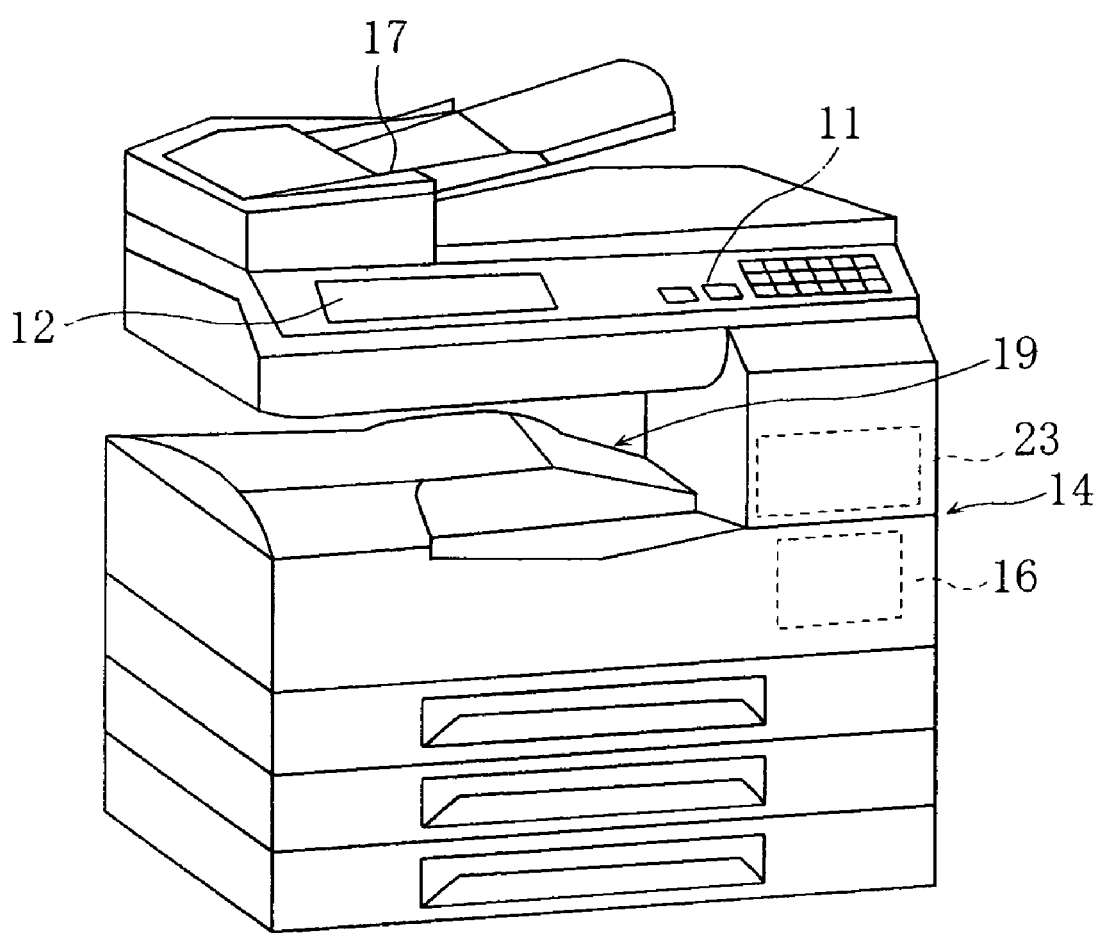
FIG. 1 is a view showing one example of the appearance of an MFP 100.
Figure 2:
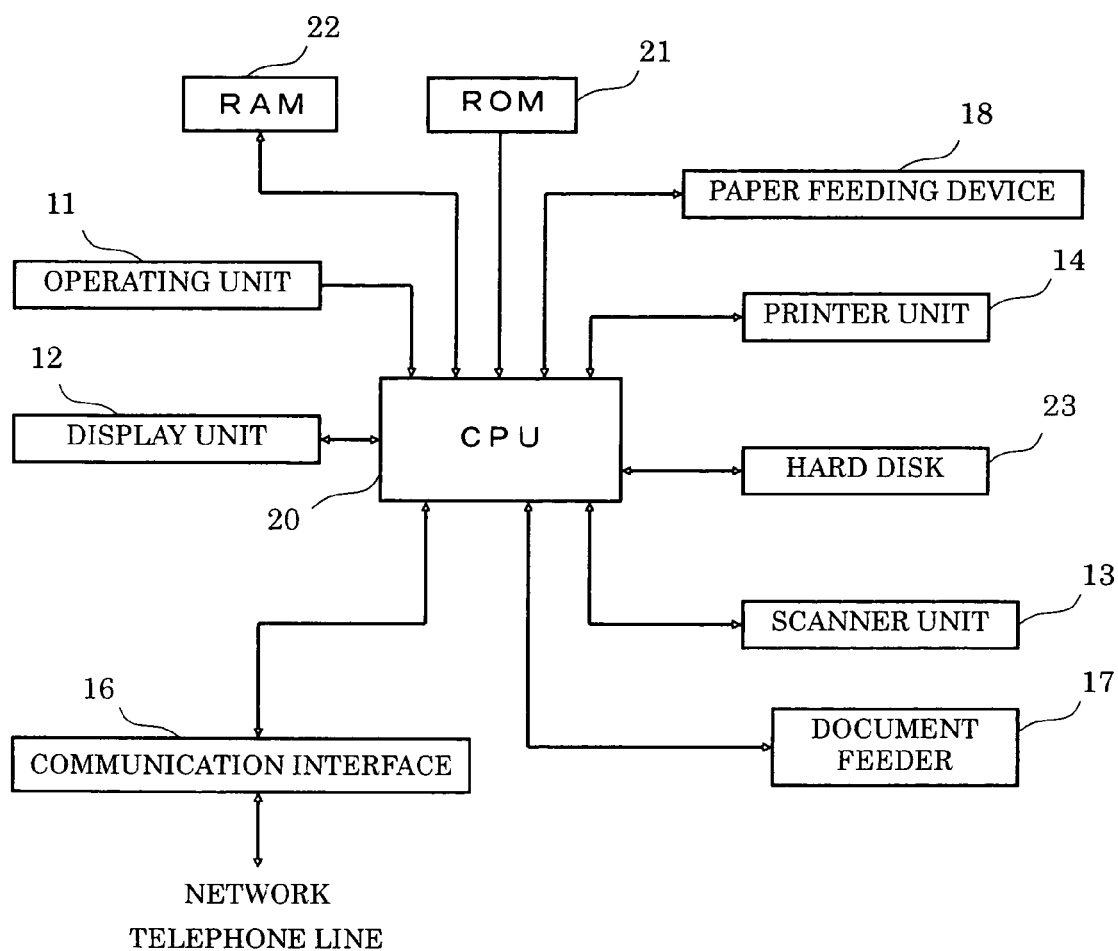
FIG. 2 is a diagram showing one example of the hardware construction of the MFP 100.

FIG. 1 is a view showing one example of the appearance of an MFP (Multifunction Peripheral) 100 as one example of an apparatus in which an access control apparatus according to the present embodiment is installed. FIG. 2 is a diagram showing one example of the hardware construction of the MFP 100. The MFP 100 is an image forming apparatus where functions such as "copy", "network printing", "scan", "fax", and "document server" (a box function) are collectively provided. Such apparatuses are also called "multifunction devices".

As shown in FIG. 2, the MFP 100 includes an operating unit 11, a display unit 12, a scanner unit 13, a printer unit 14, a communication interface 16, a document feeder 17, a paper feeding device 18, a CPU 20, a ROM 21, a RAM 22, and a hard disk 23.

The operating unit 11 is composed of a plurality of keys for inputting numerals, characters, and symbols, sensors for recognizing keys that have been pressed, and a transmission circuit for transmitting signals showing recognized keys to the CPU 20.

The display unit 12 displays screens that display messages to the user, screens for allowing the user to input settings and a content of processing, and screens showing the result of processing executed by the MFP 100. In the present embodiment, a touch panel is used on the display unit 12 and forms part of the operating unit 11. The touch panel has a function for detecting a position on the touch panel that has been pressed by the user and transmitting a signal showing the detection result to the CPU 20.

The scanner unit 13 irradiates light onto a document and detects the reflected light to read images drawn on the document and generates digital image data (here, density data showing the density of the colors RGB or black). The image data obtained in this way is used during printing by the printer unit 14 and is also converted to a file in a format such as TIFF, PDF, or JPEG and stored in the hard disk 23. The image data may also be converted to fax data and subjected to fax transmission. The document feeder 17 is provided at the top of the main body of the MFP 100 and is used to successively feed one or a plurality of document pages to the scanner unit 13.

The printer unit 14 prints images that have been read by the scanner unit 13, images of data that have been transmitted from an external apparatus such as a PC connected via a network such as a LAN, or images of fax data received by fax onto recording sheets such as paper or films. The paper feeding device 18 is provided at the bottom of the main body of the MFP 100 and is used to feed recording sheets for the images to be printed to the printer unit 14. Recording sheets on which images have been printed by the printer unit 14 are delivered to a tray 19 (see FIG. 1).

The communication interface 16 communicates via a network with an external apparatus such as a PC or transmits and receives faxes via a telephone line. An NIC (Network Interface Card), modem, TA (Terminal Adapter), or the like is used as the communication interface 16.

Programs and data for realizing basic functions of the MFP 100, such as image reading (scanning), copying of documents, transmission and reception of fax data, network printing, and document server (the "box" function), are stored in the ROM 21. Programs and data for realizing the functions of the present embodiment are also stored in the ROM 21.

Some or all of such programs or data may be installed in advance into the hard disk 23. In such case, the programs or data installed in the hard disk 23 are loaded into the RAM 22 as necessary. The functions described in the present embodiment may also be realized using not only the CPU 20 but also dedicated hardware such as a DSP (Digital Signal Processor) or an ASIC (Application Specific IC). Such functions may also be realized using the functions of general purpose programs such as an operating system (OS).

Figure 3:
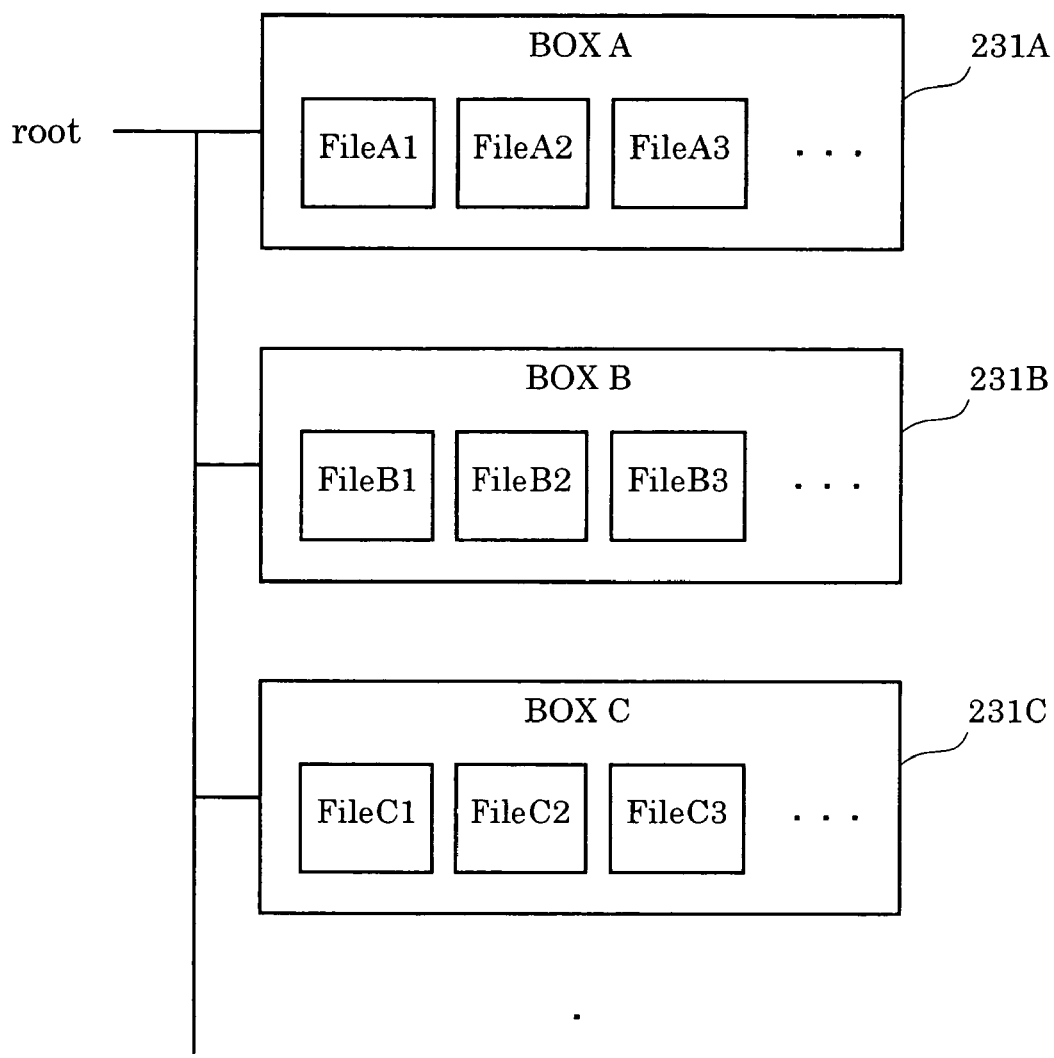
FIG. 3 is a diagram useful in explaining about boxes.

FIG. 3 is a diagram useful in explaining about boxes in the present embodiment. Boxes can be allocated in a box region 231 (see FIG. 6) on the hard disk 23 for individual users, for individual themes, for individual uses, for example. In the present embodiment, an access password can be set for each box. The access password set for each box is hereinafter referred to as a "box password". A plurality of box passwords may be set for one box. Among such box passwords, as a rule, a password that is initially set in a state where a password is yet to be set is called a "default password". A password that is added later due to a file being transported is called an "added password". The "default password" can be set by a user using the operating unit 11.

When a box password has been set, it is not possible to access files inside the box without inputting the box password. Hereinafter, the default password and added passwords are collectively referred to as the access control information of a box. The access control information can be stored in an access control information region 232 (see FIG. 6) on the hard disk 23, for example. FIG. 4 is a diagram showing one example of the content of a table storing the access control information for individual boxes. The access control information is not limited to being stored in a table, and can be added to individual boxes as box properties, for example.

In the present embodiment, a password of a file is also stored as access control information of a file stored in the box. FIG. 5 is a diagram showing one example of the content of a table storing access control information for individual files. As shown in FIG. 5, for each file, the box in which the file is stored, the default password, and added passwords are stored as the access control information of the file. The access control information of files is not limited to being stored in a table, and like the access control information of boxes, the access control information can be added to files as file properties, for example.

The passwords stored as access control information of a file in the present embodiment have a different meaning to a password that needs to be inputted when accessing the file itself. That is, as a rule, the default password of a file is the password of the box in which the file was initially stored. Added passwords of the file are added as access control information of the file when the file is transported.

Figure 6:
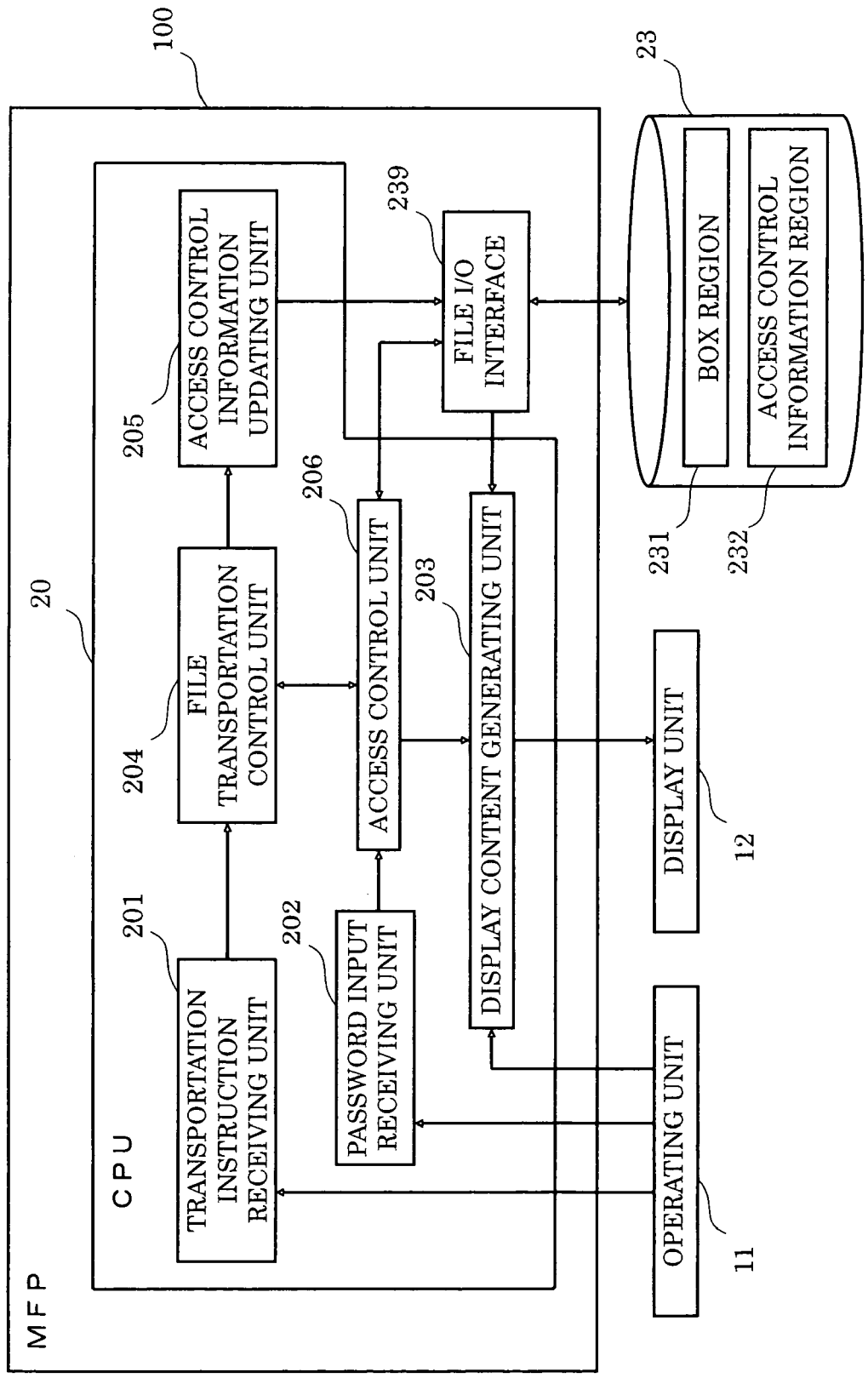
FIG. 6 is a block diagram useful in explaining one example of the functional construction of the MFP 100 in which an access control apparatus according to a first embodiment has been installed.

With the access control apparatus according to the present embodiment, the access control information of boxes and the access control information of files are used as described below. FIG. 6 is a block diagram useful in explaining one example of the functional construction of the MFP 100 in which the access control apparatus according to the present embodiment is installed. In functional terms, the MFP 100 is equipped with a transportation instruction receiving unit 201, a password input receiving unit 202, a display content generating unit 203, a file transportation control unit 204, an access control information updating unit 205, and an access control unit 206. Note that specific components of an interface that acquires an input from the operating unit 11 and an interface that displays images on the display unit 12 are omitted from FIG. 6.

The transportation instruction receiving unit 201 receives a file transportation instruction inputted by a user via the operating unit 11. More specifically, inputs of a designation of the transportation source box, a designation of the file to be transported out of the files inside the designated box, a designation of the transportation destination box, an instruction showing whether the file is to be moved or copied, for example, are received.

The password input receiving unit 202 receives an input of a password that has been inputted by the user via the operating unit 11. The display content generating unit 203 generates information representing display content for the display unit 12. The file transportation control unit 204 controls the transportation (i.e., moving or copying) of a file between boxes. The access control information updating unit 205 updates the access control information of boxes and the access control information of a file as described above when the file is transported. The access control unit 206 refers to the access control information of a box and the access control information of a file and determines whether a box or a file can be accessed by the user. The access control unit 206 also determines whether file information can be displayed on the display unit 12.

(2) Processing of the Access Control Apparatus

Figure 7:
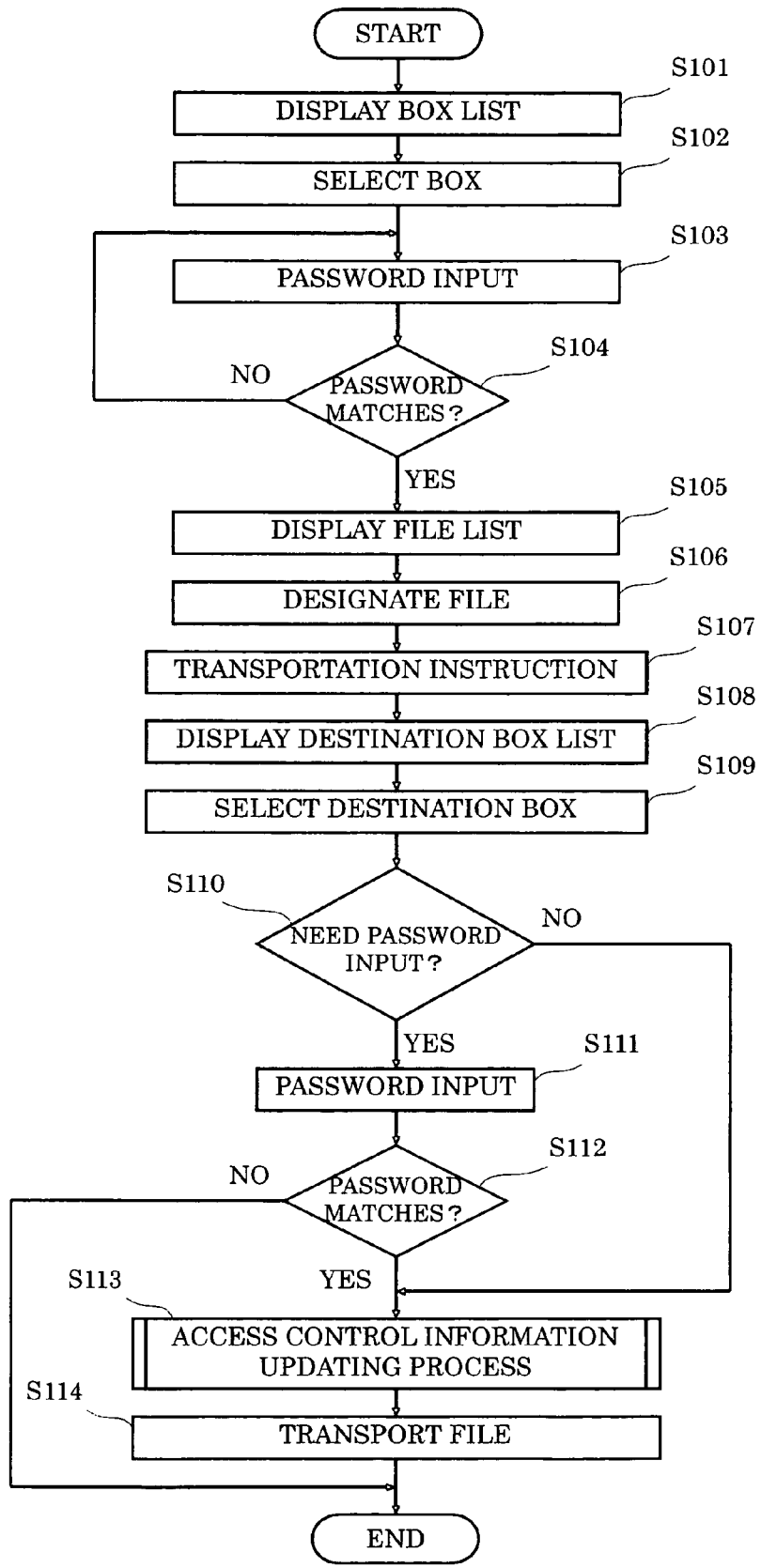
FIG. 7 is a flowchart useful in explaining the content of processing.
Figure 8:
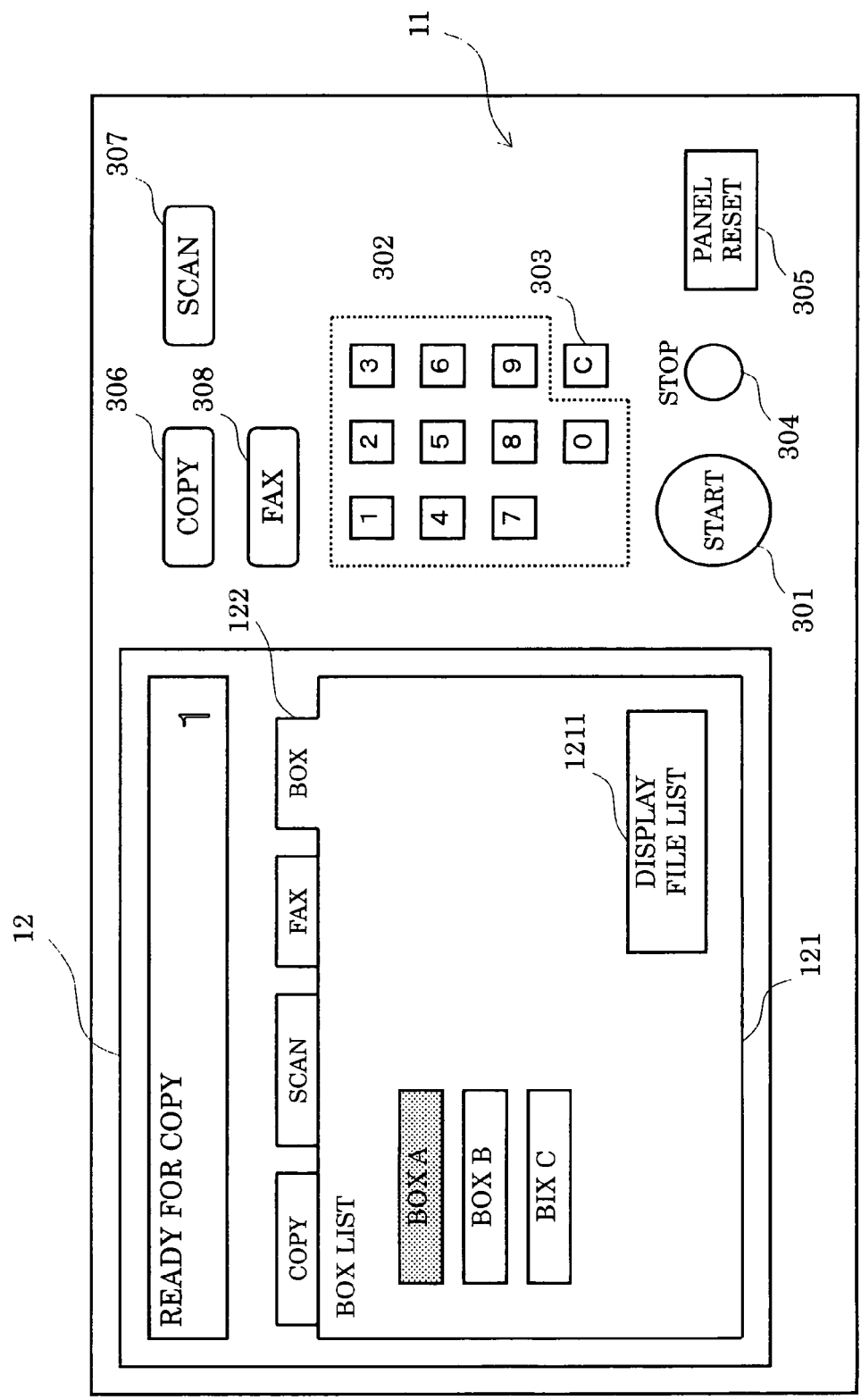
FIG. 8 is a view showing an example where a list of boxes has been displayed on a display unit 12.

The detailed processing carried out by the access control apparatus installed in the MFP 100 according to the present embodiment will now be described. FIG. 7 is a flowchart useful in explaining the processing in the present embodiment. In the present embodiment, first a list of boxes is displayed on the display unit 12 (S101). FIG. 8 is a view showing one example of a state where a list of boxes is displayed on the display unit 12. The operating unit 11 and the display unit 12 in the present embodiment will now be described in more detail.

A start button 301, a ten key 302, a clear key 303, a stop button 304, a panel reset button 305, a copy button 306, a scan button 307, and a fax button 308 are disposed on the operating unit 11. An operation region 121 is displayed on the display unit 12. As described above, a touch panel is used in the display unit 12 so that inputs can be made by pressing buttons and the like displayed in the operation region 121.

The start button 301 is used when starting an operation such as copying or fax transmission. The ten key 302 is used when inputting numbers such as a number of copies and a fax number. In the present embodiment, passwords are also inputted using the ten key 302. The clear key 303 is used to clear a number inputted by the ten key 302 and restore a default value. The stop button 304 is used when instructing that an operation such as copying or scanning should be stopped. The panel reset button 305 is used to restore the display of the display unit 12 to a default screen (a screen displayed first when the power is switched on, for example).

The copy button 306, the scan button 307, and the fax button 308 are selection buttons for designating that the MFP 100 is to operate in an operation mode selected out of "copy", "scan", and "fax". When the copy button 306 has been pressed, the MFP 100 can be used as a copier. When the scan button 307 has been pressed, the MFP 100 can be used as a scanner. When the fax button 308 has been pressed, the MFP 100 can be used as a fax transmission device.

As shown in the flowchart in FIG. 7, with the MFP 100 according to the present embodiment, when a box tab 122 displayed in the operation region 121 has been selected, first a list of boxes is displayed on the operation region 121 (S101). The user can designate any of the boxes out of the displayed list of boxes. In the example shown in FIG. 8, the button of the box A out of the three boxes displayed in the list has been pressed, and therefore the display of the designated box A in the operation region 121 is changed.

Figure 9:
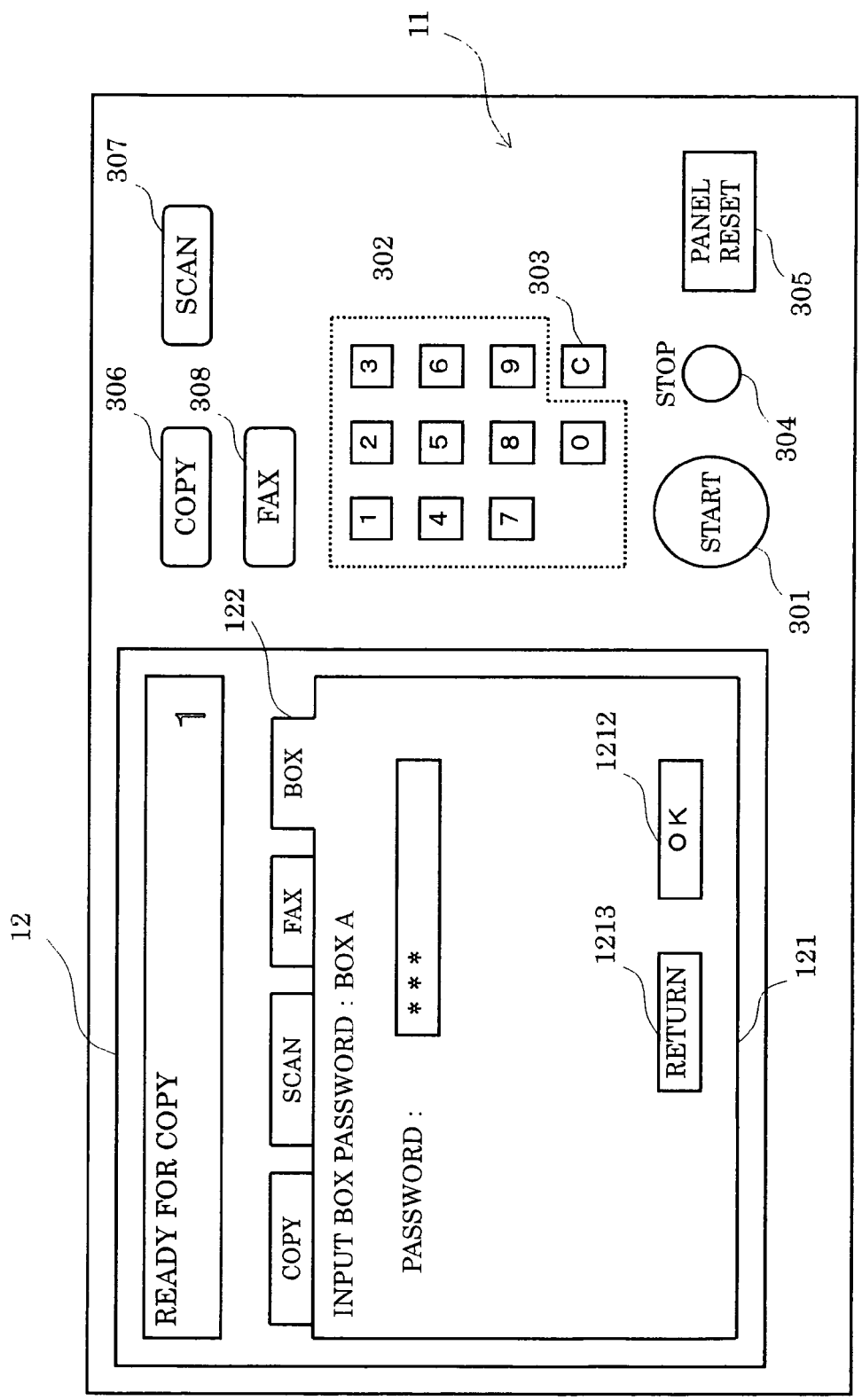
FIG. 9 is a view showing one example of a password input screen.

When a file list display button 1211 has been pressed in a state where a box has been designated (S102), the user is urged to input a password set for the selected box. FIG. 9 is a view showing one example of a password input screen. As a device for inputting a password, it is also possible to use an arrangement where a keyboard is disposed on the operating unit 11 or an external keyboard is connected and an arrangement where a software keyboard is displayed on the display unit 12, but in the present embodiment, the password is inputted using the ten key 302.

In the screen shown in FIG. 9, when an OK button 1212 has been pressed in a state where a password has been inputted, the input of a password is received (S103). When the inputted password matches the default password included in the access control information of the box ("YES" to S104), a list of files in the box is displayed on the display unit 12 (S105). When doing so, the access control unit 206 acquires the access control information from the hard disk 23 and compares the access control information with the inputted password. If the password matches the access control information, a list of the files inside the box is displayed on the display unit 12.

Figure 10:
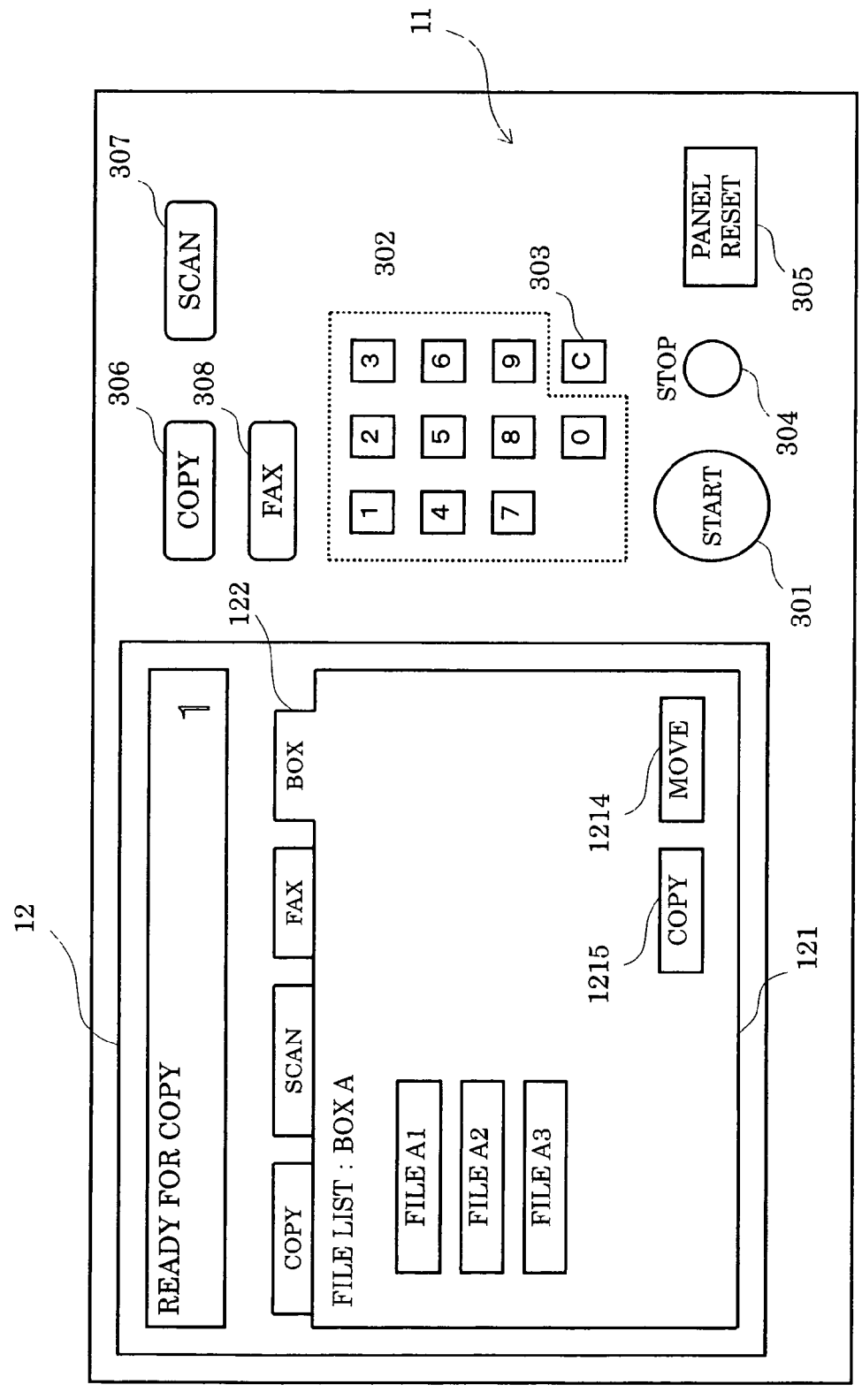
FIG. 10 is a view showing one example where a list of files has been displayed.

FIG. 10 is a view showing one example of a state where a list of files is displayed. When there are too many files for display on a single screen, as examples, a "next page" button or a scroll bar may be used.

In the same way as in FIG. 8, the user can designate any of the files by pressing the appropriate button (S106). When a move button 1214 or a copy button 1215 has been pressed in a state where a file has been designated, a transportation instruction is received for the designated file (S107).

Figure 11:
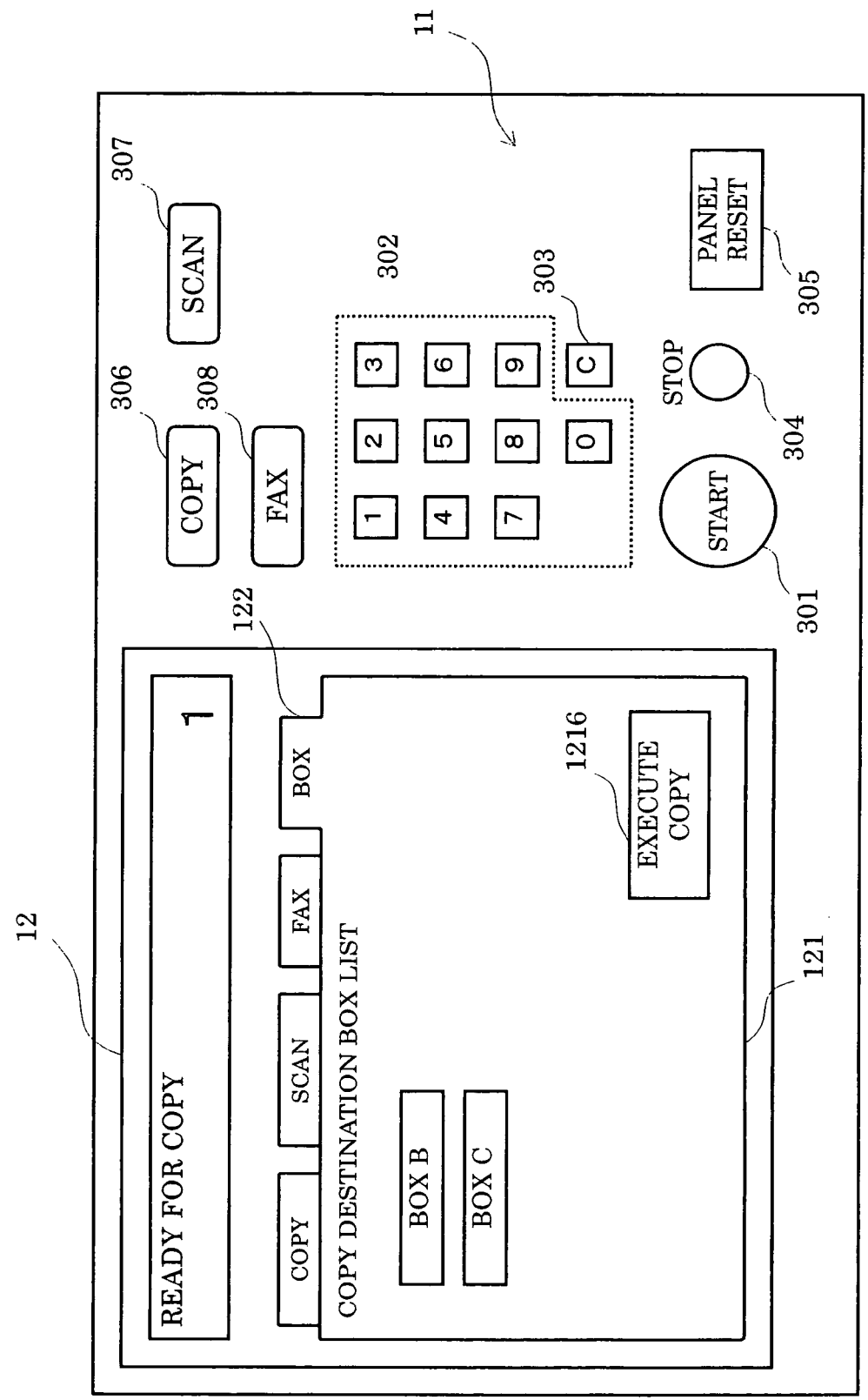
FIG. 11 is a view showing one example of a transportation destination box list display screen.

Next, a list of transportation destination boxes is displayed (S108). FIG. 11 shows one example of a display screen at this time, and although the screen is almost the same as that shown in FIG. 8, the display screen in FIG. 11 differs in that the transportation source box (in this example, the box A) is not displayed. In the same way as in FIG. 8, the user can designate the transportation destination box (in the example in FIG. 11, the copy destination). When a copy execution button 1216 (or move execution button) has been pressed, it is assumed that the transportation destination box has been selected (S109) and it is then determined whether it is necessary to input a password of the transportation destination box (S110).

One example of a case where it is necessary to input a password of the transportation destination box is when a transportation process is being carried out between boxes for which a file transportation process is yet to be carried out. Conversely, one example of a case where input of a password is unnecessary is where a password has not been set for the transportation destination box. When transportation is being carried out for a second or subsequent time from the same box to a box for which a box password has been set, operability can be improved by making the inputting of a password unnecessary.

If it is not necessary to input a password ("NO" to S110), the access control information is updated (S113), and the file is transported (i.e., moved or copied) (S114). Note that the expression "the access control information is updated" here means that the access control information of the box shown in FIG. 4 and the access control information of the file shown in FIG. 5 are updated so that the passwords before transportation are inherited after the transportation process of the file.

Next, the inheriting of passwords in the present embodiment will be described. The "inheriting of passwords" refers to control that makes it possible after a file stored in a transportation source box has been transported to another box to access the file after transportation using at least one of the passwords that could be used to access the transported file in the transportation source box. Particularly, when the box passwords of the transportation source box differ to the box passwords of the transportation destination box, inheriting passwords is extremely effective in improving operability.

Figure 12:
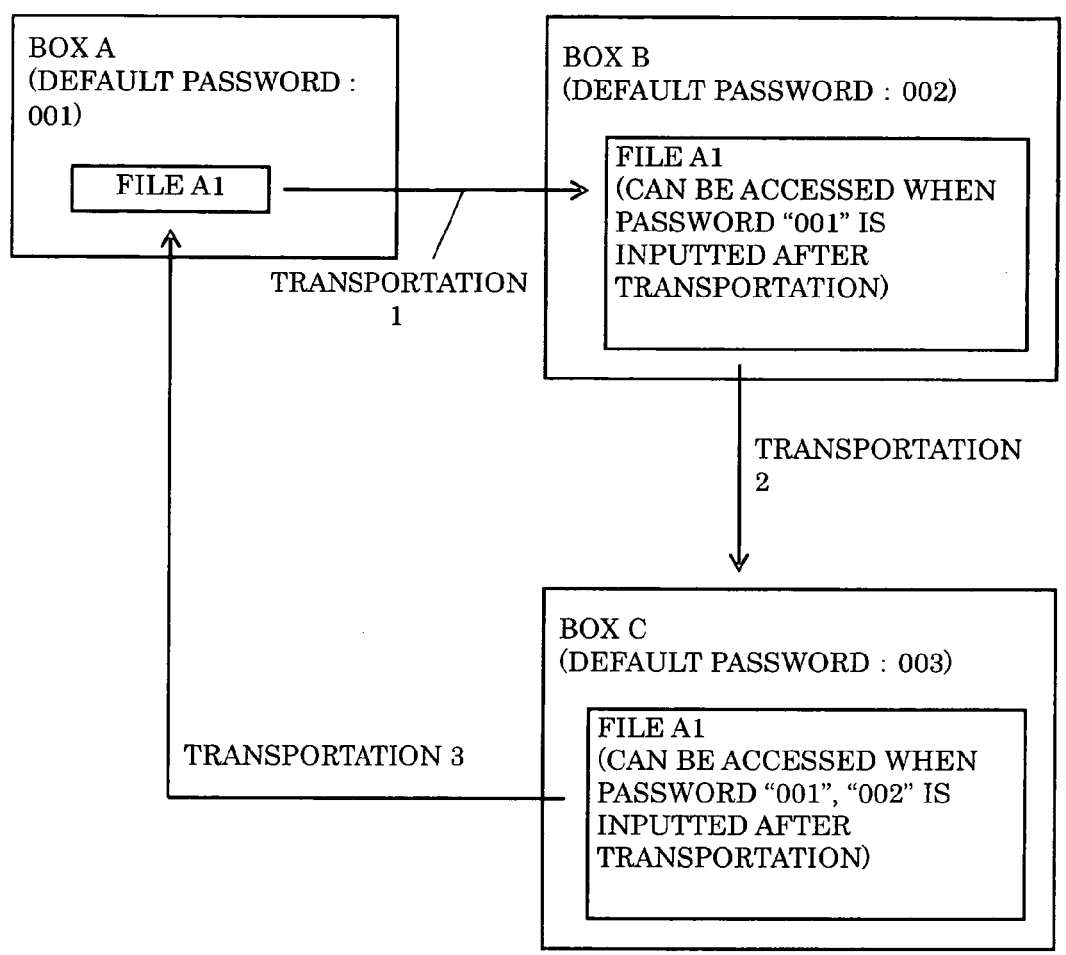
FIG. 12 is a diagram useful in explaining one example of password inheritance.

FIG. 12 is a diagram useful in explaining the inheriting of passwords in the present embodiment. In the example shown in FIG. 12, a file A1 is initially stored in a box A (with the default box password "001"). In this state, it is possible to access the file A1 by inputting the password "001" to access the box A.

Next, assume that the file A1 is to be transported to a box B (transportation 1). Conventionally, the file A1 stored in the box B can be accessed only by inputting "002" that is the password of the box B. The basic pattern for the inheritance of passwords is where after the file A1 has been transported to the box B, the file A1 stored in the box B can be accessed even when "001" that is the password of the transportation source box is inputted as the box password.

Next, the detailed processing carried out to realize the inheritance of passwords in the present embodiment will be described. In the present embodiment, passwords are inherited by updating the access control information of boxes and the access control information of files, but since the updating of the access control information differs between when files are moved and when files are copied, the updating in both cases will be described separately. FIGS. 13A to 13C are diagrams useful in explaining how the access control information is updated when a file is copied.

In FIG. 12, since the number of files increases by one when the file A1 is copied from the box A to the box B (transportation 1), one record is added to the access control information of files as shown in FIG. 13A. When doing so, in the present embodiment, the added password "001" is added as the access control information of the file A1 stored in the box B. The added password "001" is also added as access control information of the box B as shown in FIG. 14A.

When the user tries to access the file A1 inside the box B, by carrying out access control that refers to the added passwords, it becomes possible to permit access to the file A1 inside the box B using the password "001". That is, after the file A1 has been transported, the password of the file A1 before transportation is inherited.

In FIG. 12, when the file A1 is further copied from the box B to the box C (transportation 2), as shown in FIG. 13B, one more record is added to the file access control information. When doing so, in the present embodiment, the added password "002" is also added as the access control information of the file A1 stored in the box C. Also, as shown in FIG. 14B, the added passwords "001", "002" are added as access control information of the box C. When the user tries to access the file A1 inside the box C, by carrying out access control that refers to the added passwords, it is possible to permit access to the file A1 inside the box C using either of the passwords "001" and "002". That is, after transportation of the file A1, the passwords of the file A1 before transportation are inherited.

Note that although the password "001" is also inherited during "transportation 2", it is possible to inherit only the password of the immediately preceding box before transportation. When doing so, if only "002" is stored as the added password of the file A1 inside the box C as shown in FIG. 13C and only "002" is stored as the added password of the box C as shown in FIG. 14C, it will be possible to prohibit access when the password "001" is inputted to access the file A1 inside the box C.

Next, the case where a file is moved will be described. FIG. 15A to 15C are diagrams useful in explaining the updating of file access control information when moving a file. In FIG. 12, when the file A1 is moved from the box A to the box B (transportation 1), as shown in FIG. 15A, the file access control information of the file A1 is updated. When doing so, in the present embodiment, the added password "001" is stored as the access control information of the file A1 stored in the box B. Also, regarding the box access control information, in the same way as the example shown in FIG. 14A, the added password "001" is added as the access control information of the box B. When the user tries to access the file A1 inside the box B, by carrying out access control that refers to the added passwords, it is possible to permit access to the file A1 inside the box B using the password "001". That is, after the file A1 has been transported, the password of the file A1 before transportation is inherited.

In FIG. 12, when the file A1 is further moved from the box B to the box C (transportation 2), as shown in FIG. 15B, the file access control information of the file A1 is updated. At this time, in the present embodiment, the added password "002" is further added as the access control information of the file A1 stored in the box C. Also, regarding the box access control information, in the same way as the example shown in FIG. 14B, the added passwords "001", "002" are added as the access control information of the box C. When the user tries to access the file A1 inside the box C, by carrying out access control that refers to the added passwords, it is possible to permit access to the file A1 inside the box C using either of the passwords "001" and "002". That is, after the file A1 has been transported, the passwords of the file A1 before transportation are inherited. In the same way as when files are copied, it is also possible to store only "002" as the added password of the file A1 inside the box C. Note that when a file is moved, unlike the example shown in FIG. 14B, it is more preferable to delete the added password "001" of the box B.

In FIG. 12, when the file A1 is further moved from the box C to the box A (transportation 3), in the present embodiment, the file access control information of the file A1 is updated as shown in FIG. 15C. That is, the added passwords are deleted from the access control information of the file A1 that has been stored back in the box A. It is more preferable to also delete the added passwords that have been added to the box access control information. This is also the case when the file A1 that has been moved to the box B is moved back from the box B to the box A, for example.

The added passwords are deleted as described above as it is assumed that the file has been moved back to the original box after being erroneously moved or copied. In such case, there can be the risk of a security problem where the file A1 inside the box A can be accessed using the password of the box C (or box B). However, it is also possible to use an arrangement where the password of the box C (and/or box B) is inherited by the file A1 inside the box A.

Figure 16:
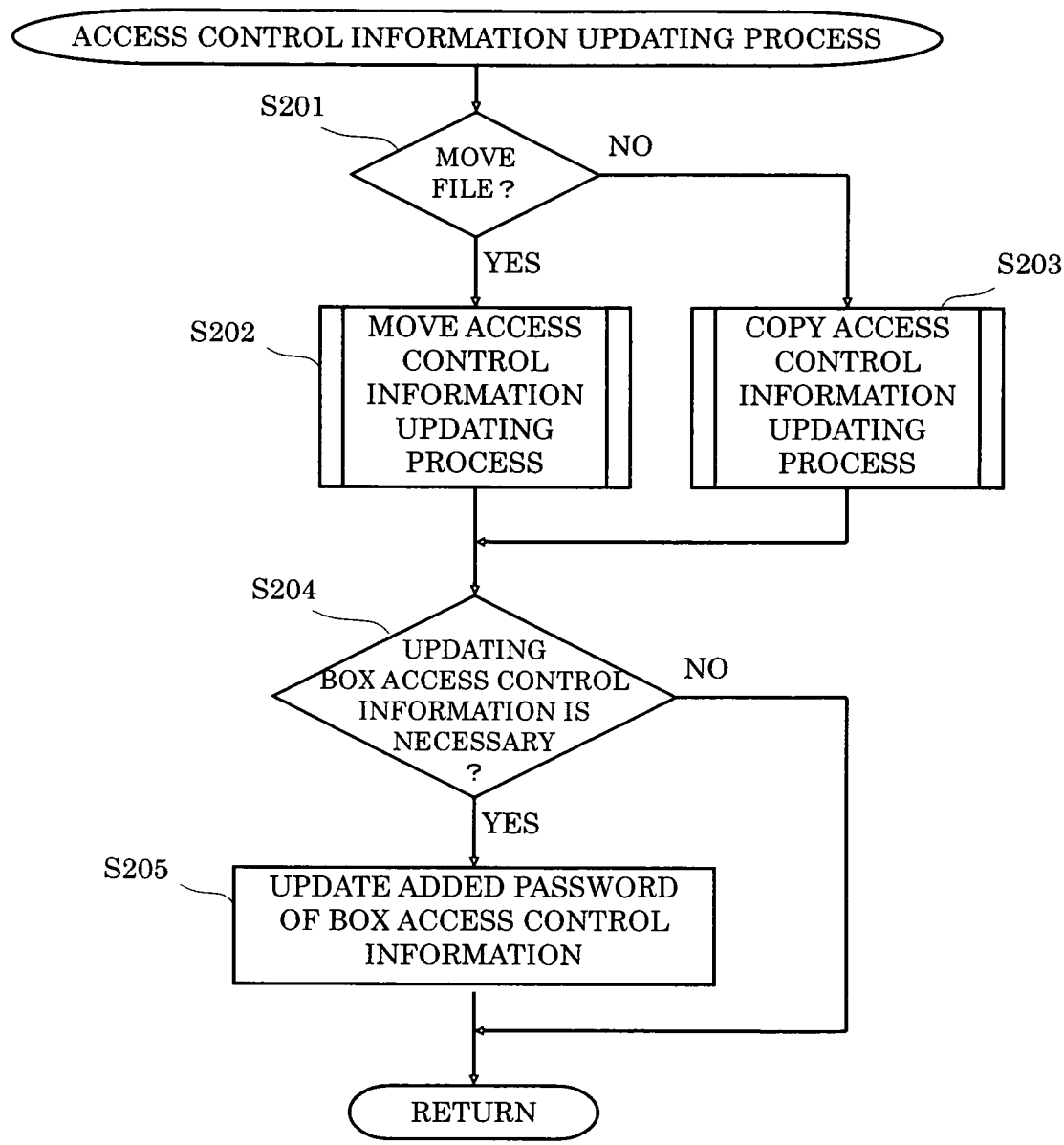
FIG. 16 is a flowchart useful in explaining one example of the content of an access control information updating process.

Next, the detailed processing to realize the inheriting of passwords described above will be described. FIG. 16 is a flowchart useful in explaining one example of the access control information updating process shown in step S113 of the flowchart shown in FIG. 7.

Since the access control information updating process described above differs between when a file is moved and when a file is copied, first it is determined whether a file is being moved or copied (S201). When a file is being moved ("YES" to step S201), a move access control information updating process is carried out (S202). Conversely, when a file is being copied ("NO" to step S201), a copy access control information updating process is carried out (S203).

Figure 17:
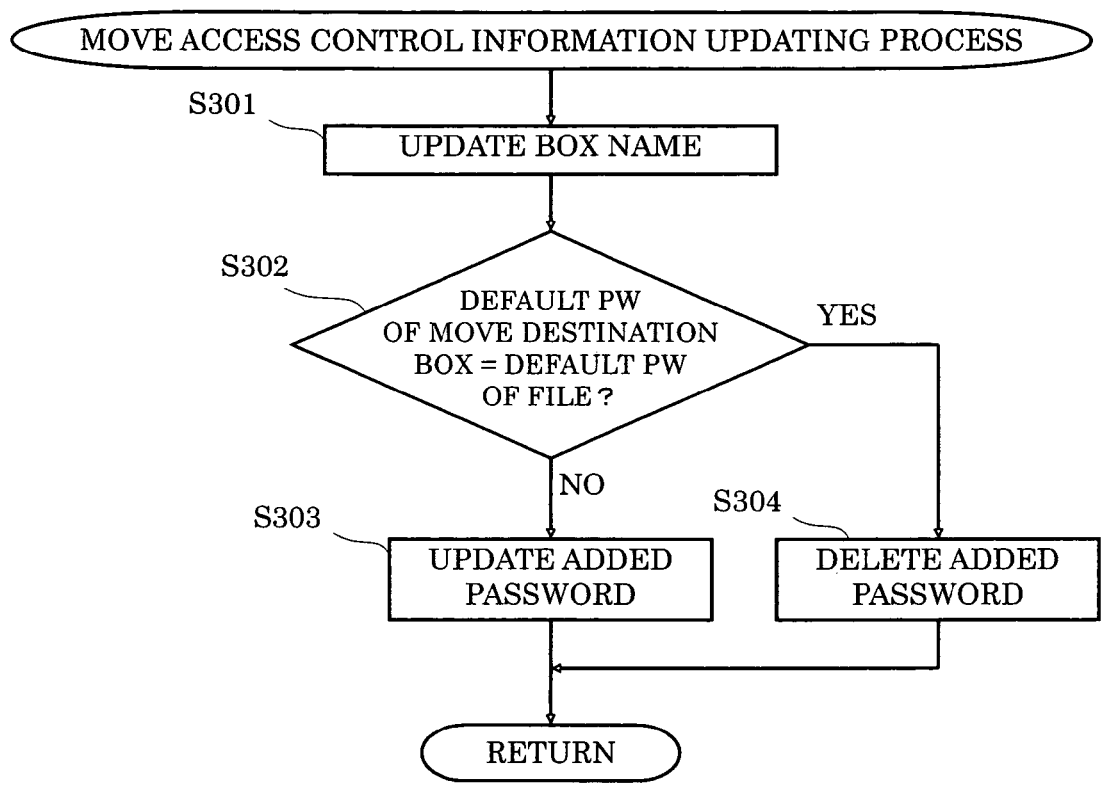
FIG. 17 is a flowchart useful in explaining one example of the content of an access control information updating process when a file is moved.

FIG. 17 is a flowchart useful in explaining one example of the move access control information updating process. As shown in FIG. 15, a record of file access control information is not added when a file is moved. First, the box name included in the file access control information of the moved file is updated from the box name of the source box to the box name of the destination box (S301). Next, if the default password of the move destination box (in flowcharts, the word "password" is also indicated as "PW") does not match the default password of the file ("NO" to step S302), as shown by the examples in FIGS. 15A and 15B, the content of the added passwords is updated (S303).

On the other hand, if the default password of the move destination box matches the default password of the file ("YES" to step S302), as shown by the example in FIG. 15C, the added passwords are deleted (S304). Note that although the case where the default password of a box has been changed is not particularly considered in the present embodiment, since step S302 is a process that determines whether the file has been returned to the original box, if a change history is stored for the default password, for example, as the access control information of a box, it is also possible to cope with changes to the default passwords of boxes.

Figure 18:
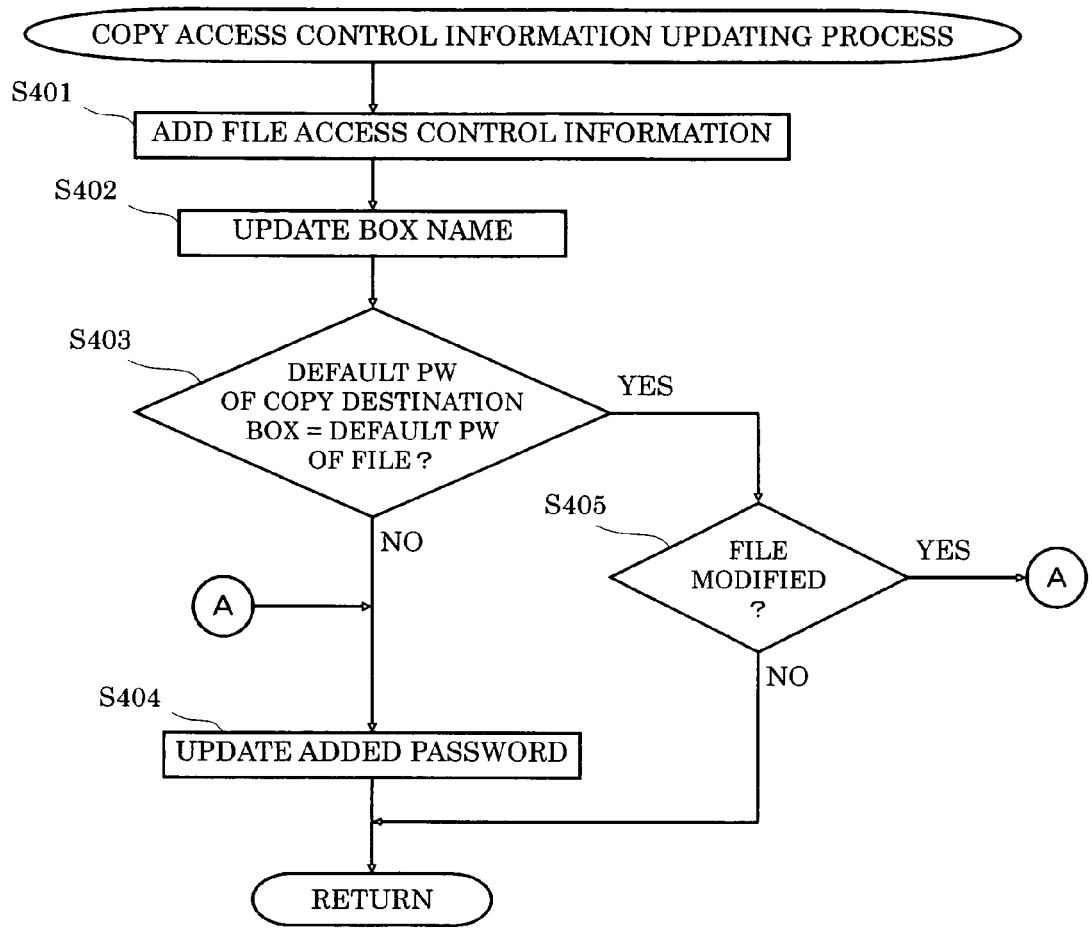
FIG. 18 is a flowchart useful in explaining one example of the content of an access control information updating process when a file is copied.

FIG. 18 is a flowchart useful in explaining one example of the copy access control information updating process. As shown in FIG. 13, during copying, first a record of access control information is added (S401). Next, the box name of the added record is updated from the box name of the copy source box to the box name of the copy destination box (S402). After this, if the default password of the copy destination box does not match the default password of the file ("NO" to S403), as shown by the example in FIG. 13A, the added passwords are updated (S404). On the other hand, if the default password of the copy destination box matches the default password of the file ("YES" to S403), in the present embodiment it is judged whether the content of the file has been modified (S405).

As one example, it is possible to judge whether the content of the file has been modified by referring to a modified date and time of the file that is stored as property information of the file. FIG. 19 is a diagram showing one example of the content of the property information of a file in the present embodiment. By comparing the modified date and time of the property information shown in FIG. 19 with the transportation date and time, it is possible to judge whether the file content has been modified after copying.

When the content of the file has not been modified ("NO" to S405), the processing is terminated at that point. Conversely, when the content of the file has been modified ("YES" to S405), the processing proceeds to step S404 where the added passwords are updated.

Note that since there are cases where the file to be copied has been deleted from the box corresponding to the default password (the box A in the example in FIGS. 13A to 13C), it should preferably be determined whether a file with the same filename is present in the copy destination box. When a file with the same filename is present, the user should preferably be urged to designate whether the file should be overwritten. Even when the determination result in step S405 is "NO", if there is no file with the same filename in the copy destination box, it is possible to carry out processing such as adding a record of file access control information to carry out copying.

Also, when the determination result in step S405 is "YES" but the file with the same filename is not to be overwritten, the copy instruction for the file is cancelled.

In addition to judging whether a file with the same filename is present, it is possible to change the processing relating to password inheritance according to whether a file with the same filename was present in the past. This process can be achieved by storing a file storage history in a box, for example.

Figure 20:
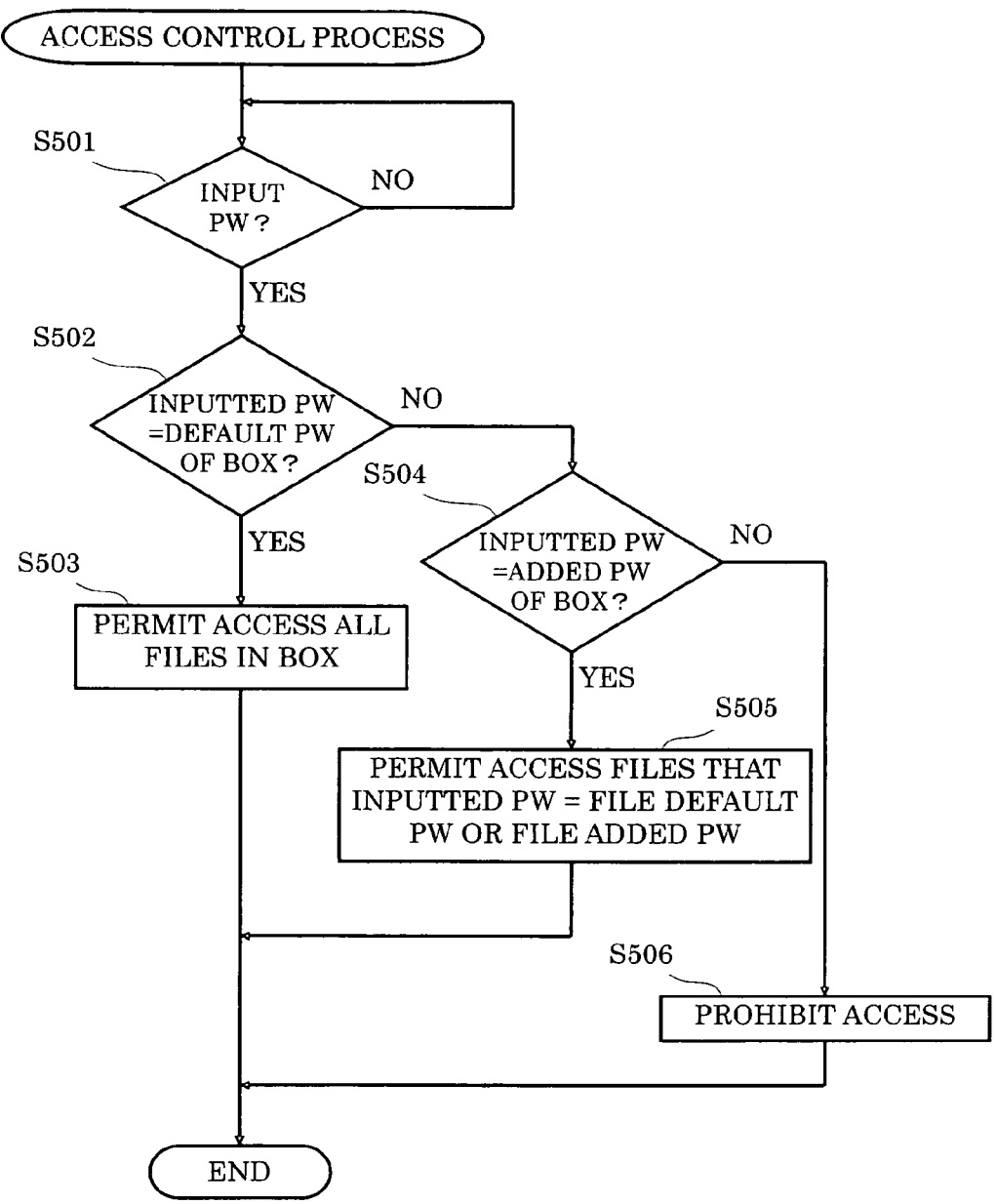
FIG. 20 is a flowchart useful in explaining one example of the content of an access control process.

The processing that refers to the access control information described above and controls access to files will now be described. FIG. 20 is a flowchart useful in explaining one example of the content of the access control process.

In the present embodiment, if the user has inputted a password required to access a box ("YES" to S501), the access control information of a box is referred to. If the inputted password matches the default password of the box ("YES" to S502), access to all of the files inside the box is permitted (S503).

If the inputted password differs to the default password of the box ("NO" to S502), the added passwords of the box are referred to and if there is a matching added password ("YES" to S504), the inputted password and the passwords stored as access control information of the files inside the box are referred to and access is permitted to only files where the default password or an added password of the file matches the inputted password (S505). Conversely, if none of the added passwords of the box matches the inputted password ("NO" to S504), access to the files inside the box is prohibited (S506).

Note that although in the example shown in FIG. 20, if the inputted password matches an added password of the box ("YES" to S504), access is permitted to the file whose default password or added password matches the inputted password (S505), when the inputted password matches an added password of the box ("YES" to S504), the processing may instead proceed to step S503 where access is permitted to all files inside the box.

Second Embodiment

Although the first embodiment described above does not particularly consider which user has instructed that a file is to be transported, in the present embodiment, the case will be described where the method of updating the access control information is changed according to which user has instructed that a file is to be transported. Such processing is extremely effective in that security is increased while improving operability.

Figure 21:
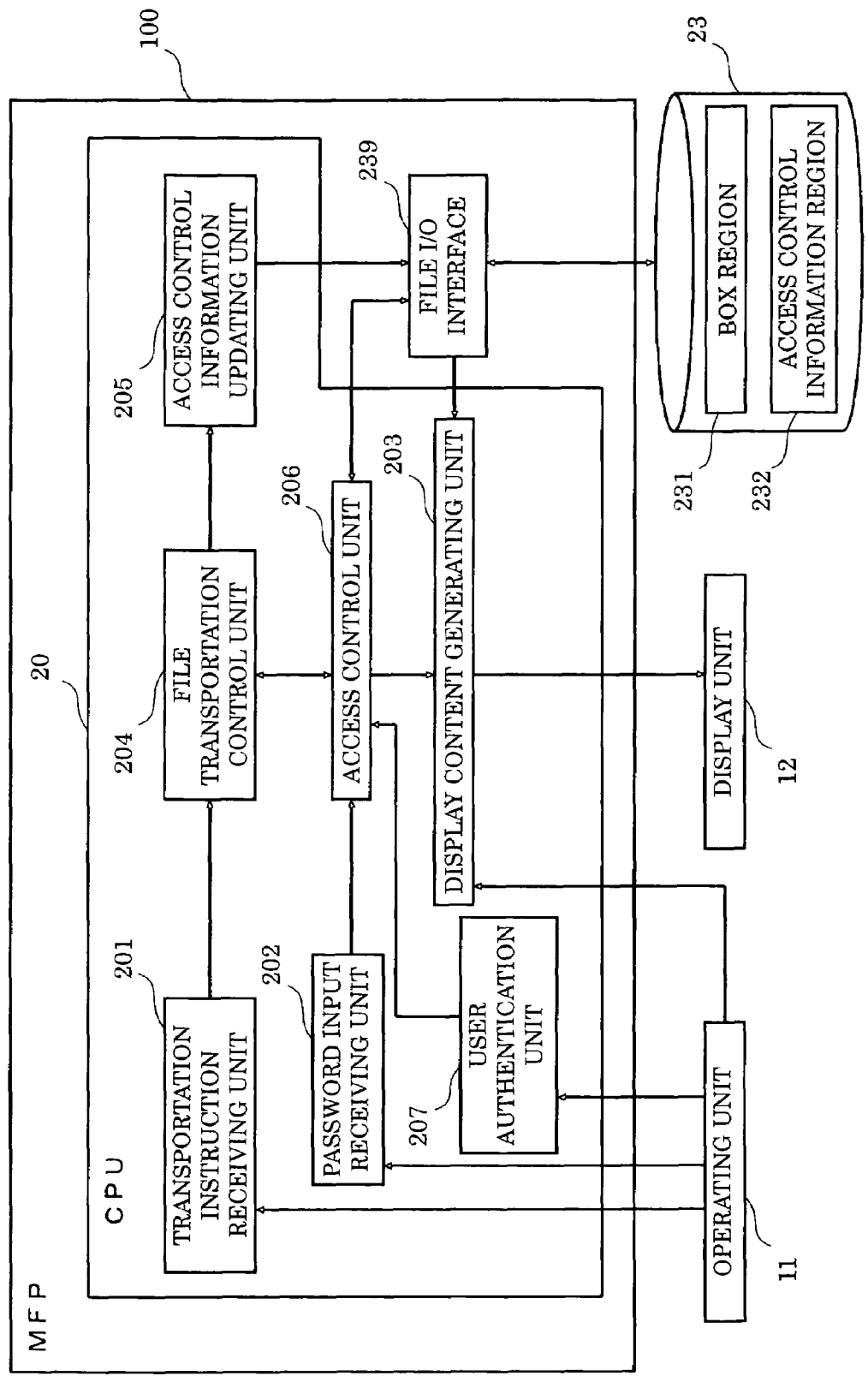
FIG. 21 is a block diagram useful in explaining one example of the construction of an access control apparatus according to a second embodiment.

FIG. 21 is a block diagram useful in explaining one example of the construction of an access control apparatus according to the present embodiment. As shown in FIG. 21, the present embodiment differs to the first embodiment in that a user authentication unit 207 is provided and although not shown in FIG. 21, a password is stored for each user in the hard disk 23 as access control information. The user authentication unit 207 carries out a user authentication process when the user tries to log in to the MFP 100 with a user authentication. As the method of user authentication, as one example, it is possible to receive an input of a user identifier (user ID) and a login password and compare the inputted information with login passwords that have been registered in advance to decide whether to permit or prohibit the login. However, the present invention is not limited to this, and it is also possible to use biometric information, for example. The identifier of the login user identified by the user authentication unit 207 is referred to during access control by the access control unit 206 and during updating of the access control information by the access control information updating unit 205.

First, passwords for individual users (hereinafter referred to as "user passwords") stored as access control information in the present embodiment will be described. Note that although the login passwords used for authentication by the user authentication unit 207 may also be used as user passwords, in the following explanation, the case where different passwords are used is described.

FIG. 22 is a diagram useful in explaining one example of the content of user passwords set in the present embodiment. As described above, the user passwords shown in FIG. 22 are stored in the hard disk 23, for example, as access control information. In the present embodiment, each user can set a plurality of user passwords and can set priority rankings for the respective user passwords.

Figure 23:
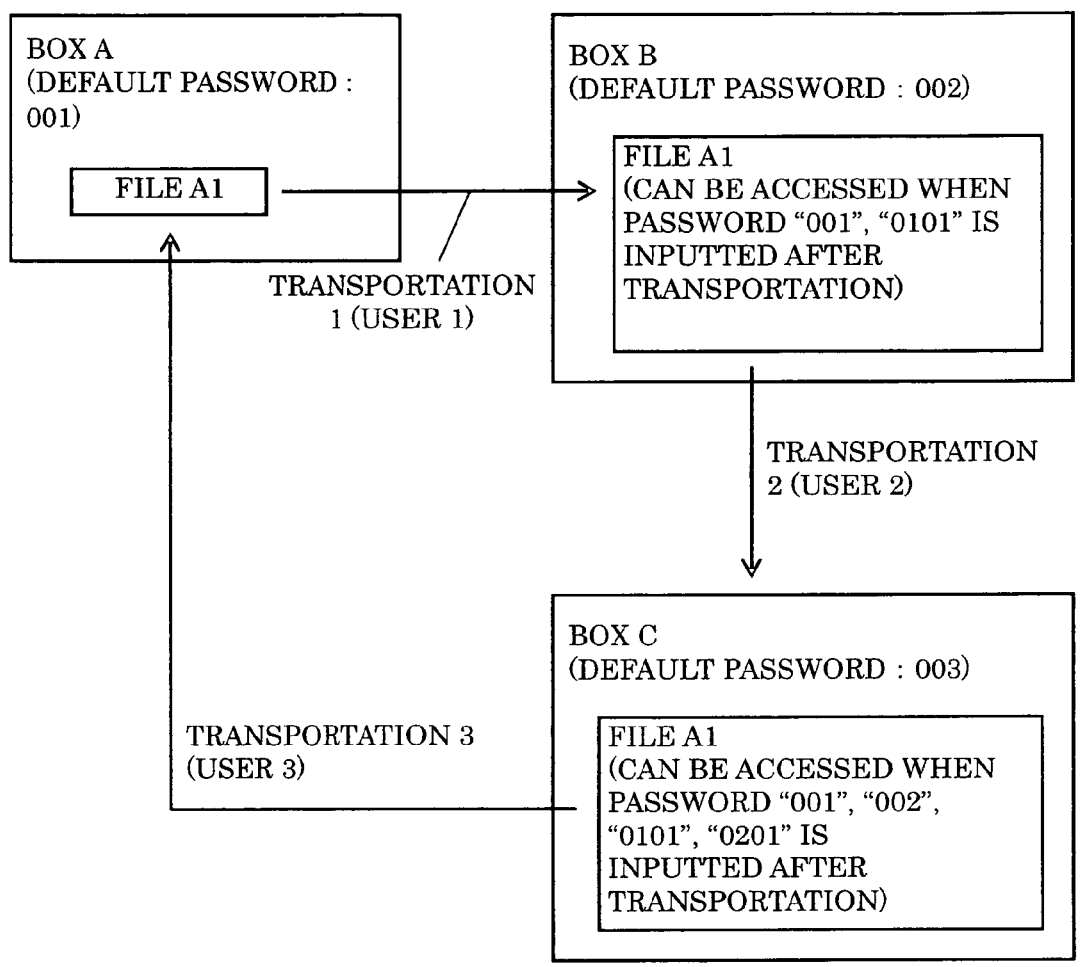
FIG. 23 is a diagram useful in explaining password inheritance in the second embodiment.

In the present embodiment, after a file has been transported, access control is carried out so that the file after transportation can be accessed using the user password of the user who instructed the transportation. FIG. 23 is a diagram useful in explaining password inheritance in the present embodiment. In the same way as in FIG. 12, the file A1 is initially stored in the box A (the default password of the box is "001"). In this state, by inputting the password "001" to access the box A, it is possible to access the file A1.

Next, the file A1 is transported by user 1 to the box B (transportation 1). In the present embodiment, after the file A1 is transported to the box B, access to the file A1 stored in the box B is permitted when "001" that is the password of the transportation source box or "0101" that is the user password of user 1 who designated the transportation (in the illustrated example, the user password with the priority ranking "1") has been inputted.

Such password inheritance can be applied in the same way when the user 2 transports the file A1 from the box B to the box C (transportation 2). For example, after the file A1 has been transported to the box C by transportation 2, the file A1 stored in the box C can be accessed by inputting any of "001" and "002" that are the passwords of the transportation source boxes, and "0101" that is the user password of the user 1 and "0201" that is the user password of the user 2 who designated the respective transportations.

However, there may be cases where security is reduced by an excessive increase in the number of passwords that allow access. For this reason, the inheriting of passwords can be carried out with selecting from a variety of settings and/or switching between such settings in view of the various points given below, for example.

(1) Priority Rankings of Added User Passwords

As one example, it is possible to add only the user password with the highest priority ranking (the example shown in FIG. 23). It is also possible to add a plurality of user passwords up to a priority ranking set in advance. Alternatively, the user passwords of all priority rankings may be added.

Figure 24:
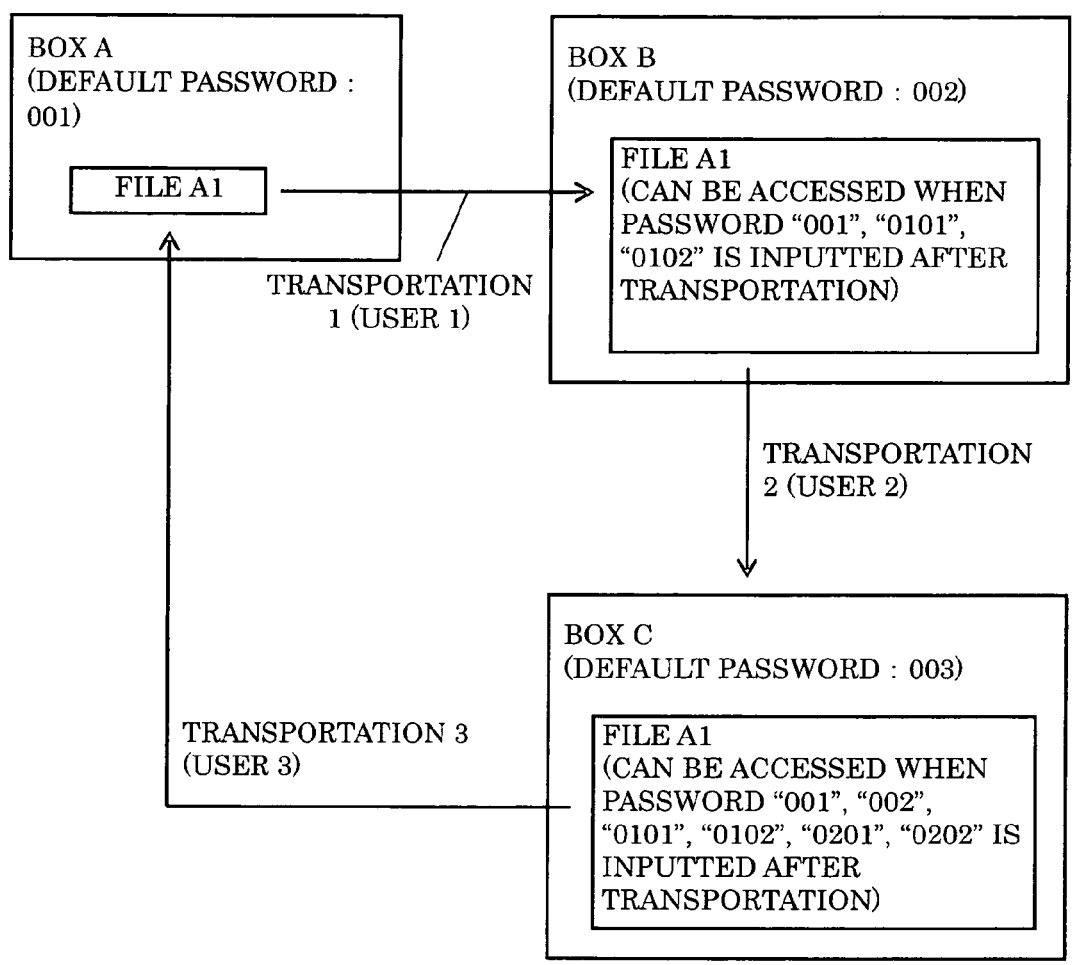
FIG. 24 is a diagram useful in explaining one example where the inheritance of user passwords up to priority ranking "2" has been designated.
Figure 25:
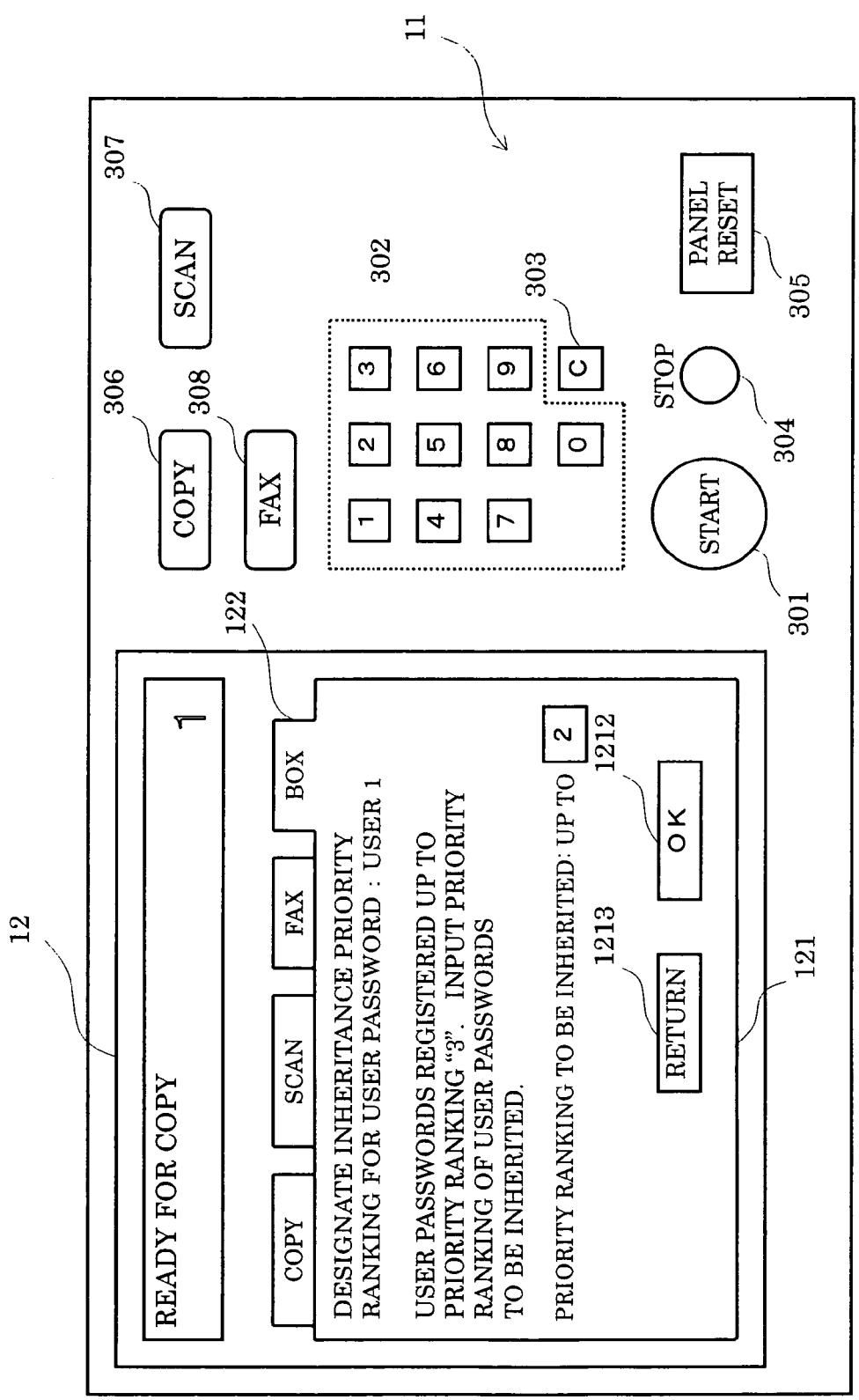
FIG. 25 is a view showing one example of a screen for designating up to which priority ranking user passwords are to be inherited.

FIG. 24 is a diagram useful in explaining an example where a setting has been made to inherit user passwords up to the priority ranking "2". In the example in FIG. 24, the file A1 stored in the box B can be accessed even when "0102" that is a user password with the priority ranking "2" of user 1 has been inputted. When the file A1 has been transported by the user 2 from the box B to the box C (transportation 2), the file A1 stored in the box C can be accessed even when "0202" that is the user password with the priority ranking "2" of user 2 has been inputted. FIG. 25 is a view showing one example of a screen showing up to which priority ranking the user passwords are to be inherited.

(2) User Passwords Added when a File is Transported Multiple Times

It is possible to inherit only the user passwords of the user who instructed the most recent transportation of a file. It is also possible to inherit the user passwords of the users who instructed a predetermined number of the most recent transportations of the file. It is also possible to inherit the user passwords of all of the users who have instructed transportations of the file.

Figure 26:
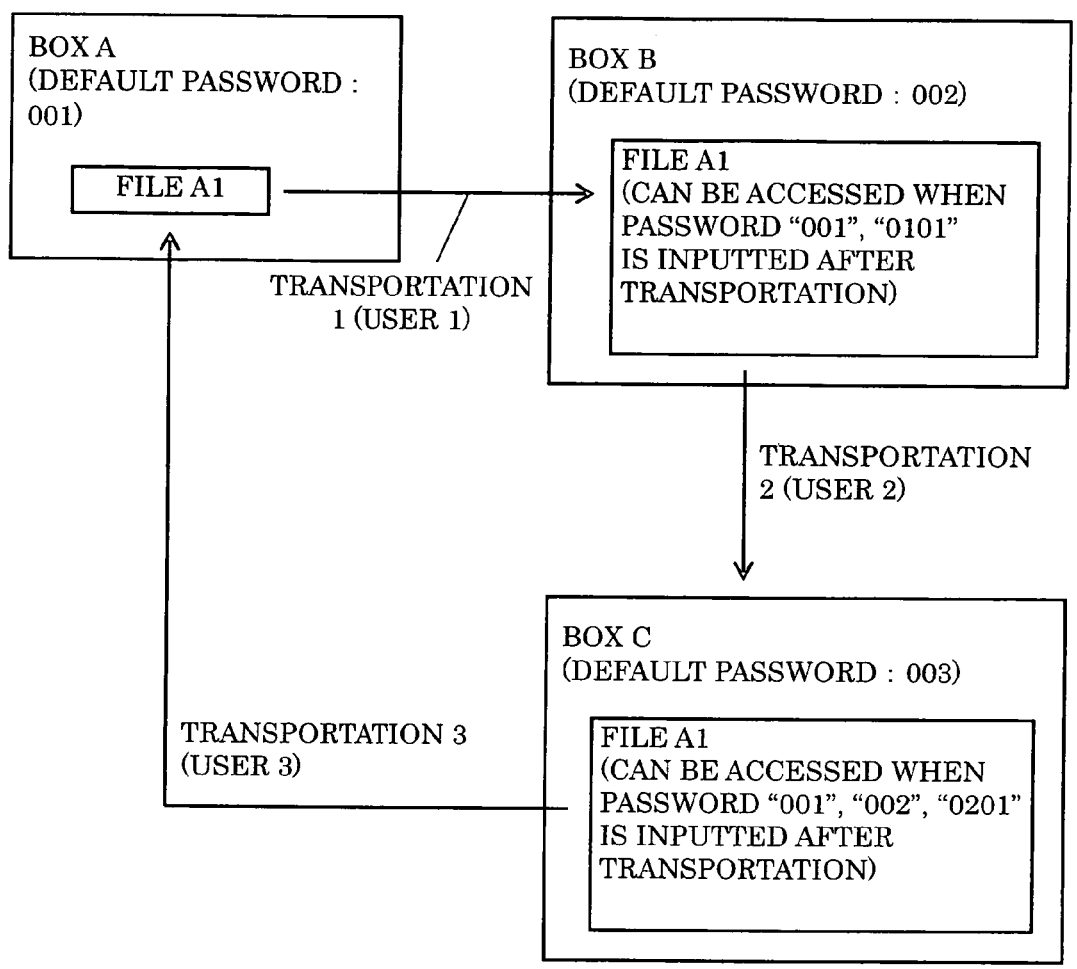
FIG. 26 is a diagram useful in explaining one example where only user passwords of the user who instructed an immediately preceding transportation are inherited.

FIG. 26 is a diagram useful in explaining an example where the user passwords of only the user who instructed the most recent transportation are inherited. In the illustrated example, when the file A1 has been transported from the box B to the box C by user 2 (transportation 2), access is not permitted when "0101" that is a user password of user 1 is inputted to access the file A1 stored in the box C.

(3) Processing when a File with the Same Filename is Present in the Transportation Destination Box In the same way as transportation 3 shown in FIG. 23, when a transportation returns a file to the box in which the file was originally present, as one example, it is possible to clear the user passwords that have been inherited thus far. It is also possible to inherit the user passwords of the user who instructed the transportations thus far without the passwords being cleared. It is also possible to switch whether user passwords are inherited according to whether the content of the file has been modified or not.

It is also possible to use a combination of the above, for example, to set the priority ranking up to which passwords are inherited separately for each user. Various other patterns for inheriting passwords are also possible. As the method for realizing such access control, it is possible to use the same method as the first embodiment. That is, in an updating process for the access control information, updating may be carried out to also add user passwords to the added passwords of boxes and the added passwords of files.

Third Embodiment

In the second embodiment described above, password inheritance is described for the case where a plurality of user passwords are stored together with priority rankings as access control information, but it is also possible to use such priority rankings for access control. FIG. 27 is a diagram useful in explaining access control in the present embodiment.

In the illustrated example, the files A1 to A6 that were initially in the box A have been transported to the box B by user 1. Here, the files A1 to A4 have inherited only the user password "0101" that has the priority ranking "1" but the files A5 and A6 have also inherited the user password "0102" that has the priority ranking "2".

In the present embodiment, the user is urged to input a password when accessing the box B and when a user password has been inputted, control is carried out over the files to be displayed on the display unit 12 (i.e., accessible files) according to the priority ranking of the inputted password. That is, when the password "0102" with the priority ranking 2 has been inputted, only the files A5 and A6 are displayed on the display unit 12 (i.e., only the files A5 and A6 are accessible).

On the other hand, when the password "0101" with the priority ranking 1 has been inputted, the files A1 to A6 are displayed on the display unit 12 (i.e., the files A1 to A6 are accessible).

Modifications

Although embodiments of the present invention have been described above, it should be obvious that the scope of the present invention is not limited to the specific examples described in the embodiments given above and various modifications such as those described below are possible.

(1) Although the access control information of boxes and the access control information of files are managed in the above embodiments by being stored in separate tables, such information is not limited to being stored in tables and may be stored by being appended to individual boxes and files as property information, for example. FIG. 28 is a diagram showing one example of the content of the property information for the case where the access control information is added to the property information of a file.

Figure 29:
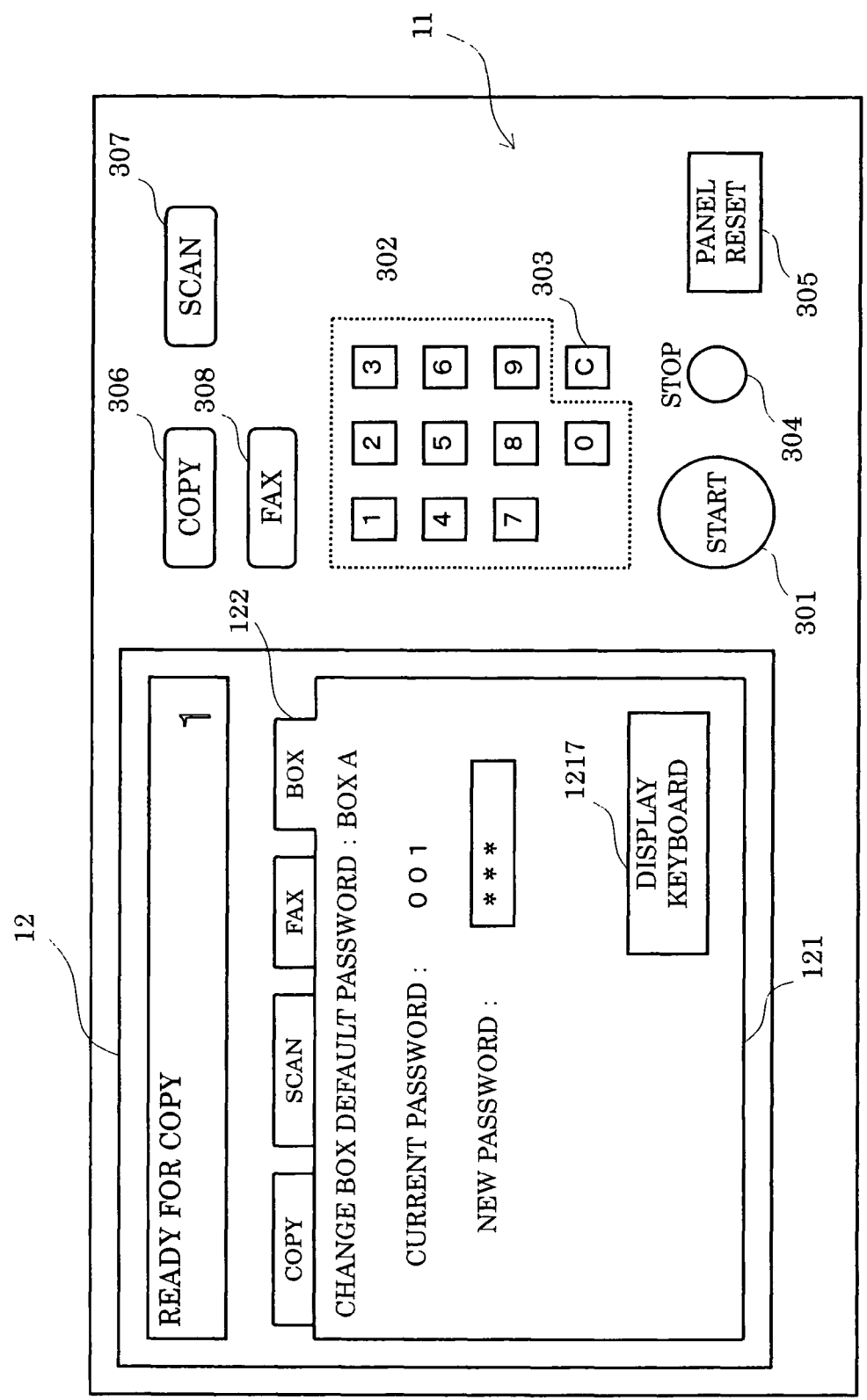
FIG. 29 is a view showing one example of an access control information modifying screen.

(2) Although detailed description of changes to the access control information, such as changes to the default passwords of boxes, changes to the user passwords, and changes to the priority rankings caused by user operations has been omitted from the embodiments described above, it is possible to use a construction where such access control information can be changed. More specifically, it is possible to use a construction where a screen such as the example shown in FIG. 29 is displayed on the display unit 12 and inputted changes are received via the operating unit 11 (aside from the ten key 302, it is possible to use a construction where a software keyboard is displayed on the operation region 121 when a keyboard display button 1217 has been pressed).

When as described above, a construction is used where the access control information can be changed by user operations, password change history information should preferably be stored as access control information. For example, if information such as a pre-change password, a change date, and the user identifier of the user who made the change is stored, access control for a file that was transported before the password was changed can be carried out in the same way as before the change in password.

(3) Although the case where a hard disk provided inside the MFP 100 is used as the storage device has been described in the above embodiments, it is also possible to use an external storage device such as a USB memory or a memory card as the storage device. Here, the access control information of boxes and files can be stored in an external storage device or can be stored in an apparatus (such as the MFP 100) in which the access control apparatus is installed.

Figure 30:
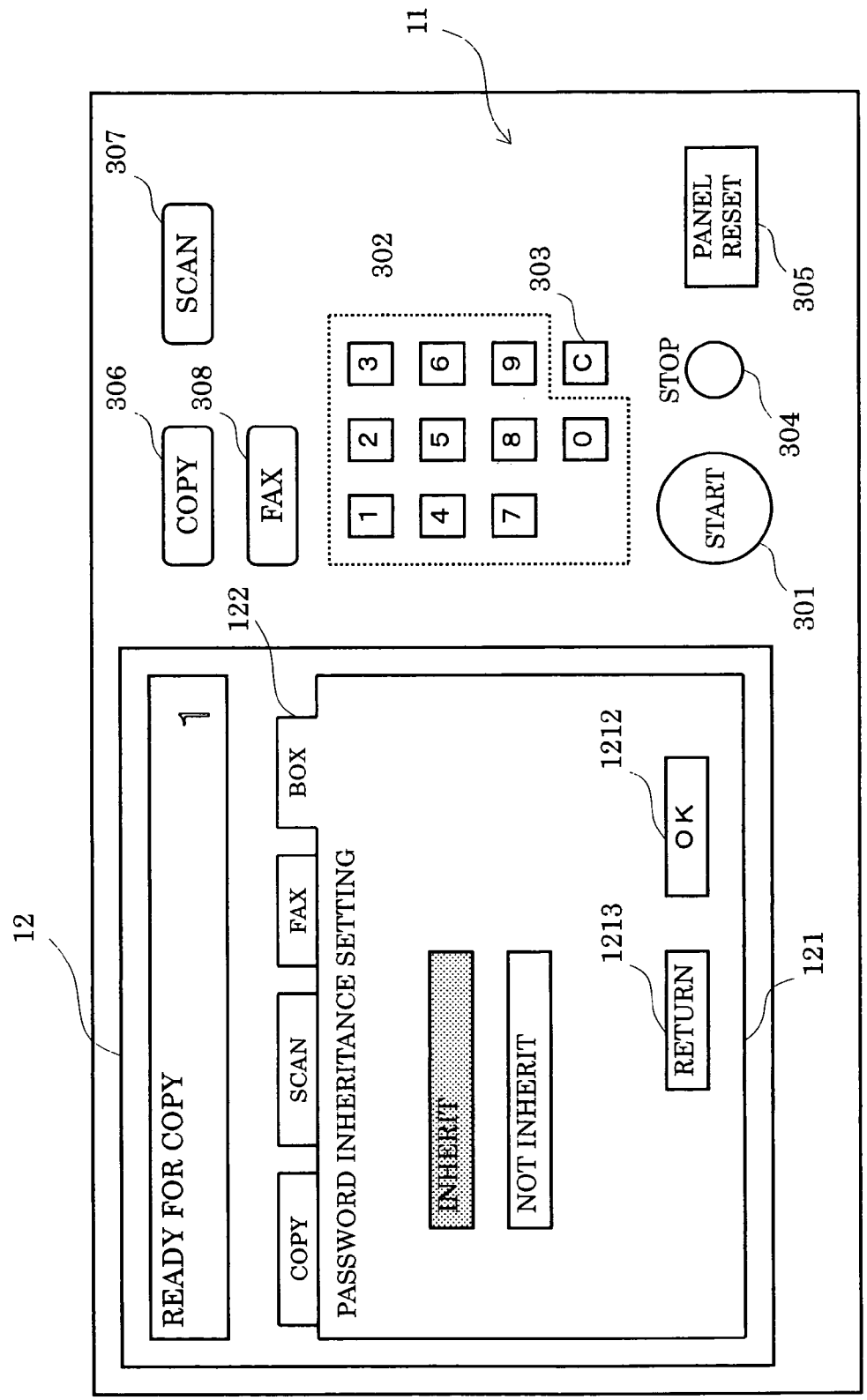
FIG. 30 is a view showing one example of a screen for setting whether passwords are to be inherited.

(4) Although the case where passwords are inherited is described in the above embodiments, it is possible to make a setting so that passwords are not inherited. FIG. 30 is a diagram showing one example of a setting screen for setting whether passwords are inherited. When a setting has been made in FIG. 30 so that passwords are not inherited, it is possible to carry out processing so that passwords are not inherited. The setting of whether passwords are to be inherited can be made for the entire apparatus, or can be made for each user, for example.

Figure 31:
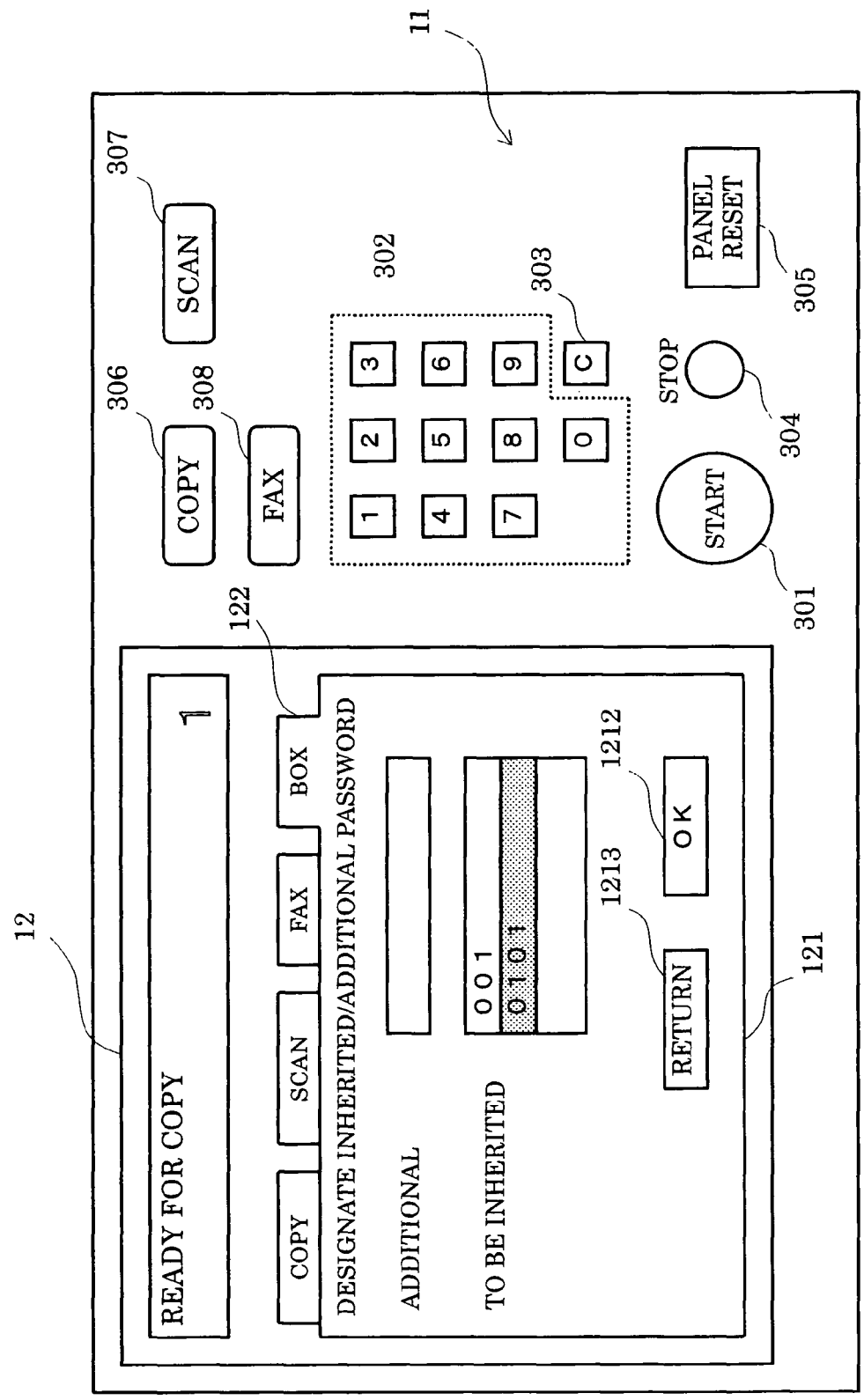
FIG. 31 is a diagram showing one example of a screen for designating which passwords are to be inherited (or added).

(5) It is also possible to use a construction where whenever a file is transported, a screen such as the example shown in FIG. 31 is displayed to enable the user to designate which passwords are to be inherited (or added). In the example shown in FIG. 31, it is possible to select the password(s) to be actually inherited out of the passwords "001" and "0101" that can be inherited or to designate a password to be newly added. By updating the access control information so that the designated password is added to the added passwords of the access control information, it is possible to carry out access control in the same way as the embodiments described above.

(6) Although the case where an access control apparatus is installed in the MFP 100 has been described in the above embodiments, an access control program that carries out the access control process described above is not limited to being installed in an image processing apparatus such as an MFP and can be used in any apparatus, such as a personal computer (PC), that accesses a storage device containing a plurality of file storage regions for which passwords can be set.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An access control apparatus that controls access to a storage device containing a plurality of file storage regions that are respectively capable of storing a plurality of files, the access control apparatus comprising:
    an access password input device that receives an input of an access password;
    an access control information acquiring unit that acquires access control information indicating an access password to be inputted for accessing to a file stored in a file storage region in the case where a region access password is set for the file storage region; and
    an access controller that controls access to a file stored in a file storage region, based on the inputted access password and the access control information,
    wherein the access controller is operable when different region access passwords are set for accessing a first file storage region and a second file storage region, respectively, to control access after a file stored in the first file storage region has been moved or copied to the second file storage region so that at least one password that could be used to access the file in the first file storage region is inherited after the file has been moved or copied to the second file storage region.

2. The access control apparatus according to claim 1, further comprising
    an access control information updating unit that updates the access control information so that the file that has been moved or copied to the second file storage region can be accessed using at least one password that could be used to access the file in the first file storage region after the file stored in the first file storage region has been moved or copied to the second file storage region.

3. The access control apparatus according to claim 1, further comprising
    a default password input device that receives an input of a default password set for a file storage region for which a region access password has not been set.

4. The access control apparatus according to claim 3, wherein the default password can be updated after being set.

5. The access control apparatus according to claim 1, wherein the access controller controls access so that after the file stored in the first file storage region has been moved or copied to the second file storage region, the file that has been moved or copied to the second file storage region can be accessed using the region access password set for the first file storage region.

6. The access control apparatus according to claim 1, wherein the access controller controls access so that every file inside the second file storage region can be accessed using the region password set for the first file storage region after the file stored in the first file storage region has been moved or copied to the second file storage region.

7. The access control apparatus according to claim 1, further comprising
    an inherited password designation input device that receives an input designating a password to be inherited after moving or copying.

8. The access control apparatus according to claim 1, further comprising
    an inheritance cancellation input device operable to receive an input designating that passwords that could be used to access the file in the first file storage region are not to be inherited after the file has been moved or copied to the second file storage region.

9. The access control apparatus according to claim 1, further comprising
    a file modification determining unit operable when a file with the same name as the file is present in the second file storage region, to determine whether the files have different contents,
    wherein the access controller switches an access control method after the file has been moved or copied to the second file storage region according to a determination result of the file modification determining unit.

10. The access control apparatus according to claim 1, further comprising
    a file existence history determining unit that determines whether a file with the same name as the file has ever existed in the second file storage region,
    wherein the access controller switches an access control method after the file has been moved or copied to the second file storage region according to a determination result of the file existence history determining unit.

11. The access control apparatus according to claim 1, further comprising
    an instruction user identification unit that identifies a user who instructed moving or copying of the file,
    wherein the access control information acquiring unit acquires a user password set for each user as the access control information, and
    the access controller controls access so that the file that has been moved or copied to the second file storage region can be accessed using the user password set for the user identified by the instruction user identification unit after the file stored in the first file storage region has been moved or copied to the second file storage region.

12. The access control apparatus according to claim 11, wherein a plurality of the user passwords can be set together with respective priority rankings.

13. The access control apparatus according to claim 12, wherein the access controller controls access so that the file after moving or copying to the second file storage region can be accessed using user passwords with priority rankings up to one of the priority rankings.

14. The access control apparatus according to claim 13, further comprising
    an effective user password priority input device that receives an input designating an effective priority ranking, wherein the file after moving or copying to the second file storage region is accessible using user passwords with priority rankings up to the effective priority ranking.

15. The access control apparatus according to claim 14, further comprising
    an access control information updating unit that updates the access control information, wherein the access control information updating unit updates the access control information for the file after moving or copying in accordance with an input received by the effective user password priority input device.

16. An access control method of controlling access to a storage device containing a plurality of file storage regions that are respectively capable of storing a plurality of files, the access control method comprising the steps of:

receiving an input of an access password;

acquiring access control information indicating an access password to be inputted for accessing to a file stored in a file storage region in the case where a region access password is set for the file storage region;

controlling access to a file stored in a file storage region, based on the inputted access password and the access control information; and controlling access to a file that has been moved or copied from a first file storage region to a second file storage region so that at least one password that could be used to access the file in the first file storage region is inherited when different region access passwords are set for accessing the first file storage region and the second file storage region, respectively.

17. The access control method according to claim 16, further comprising the step of:

updating the access control information so that the file that has been moved or copied to the second file storage region can be accessed using at least one password that could be used to access the file in the first file storage region after the file stored in the first file storage region has been moved or copied to the second file storage region.

18. A recording medium on which an access control program is stored, the access control program causing a processor to execute the steps of:

acquiring an input of an access password;

acquiring access control information indicating an access password to be inputted for accessing to a file stored in a file storage region in the case where a region access password is set for the file storage region;

controlling access to a file stored in a file storage region, based on the inputted access password and the access control information; and controlling access to a file that has been moved or copied from a first file storage region to a second file storage region so that at least one password that could be used to access the file in the first file storage region is inherited when different region access passwords are set for accessing the first file storage region and the second file storage region, respectively.

19. An image processing apparatus including a storage device in which a plurality of file storage regions that are respectively capable of storing a plurality of files can be allocated, the image processing apparatus comprising:

a scanner unit that reads a document image to obtain image data;

an image data processing unit that stores the image data obtained by the scanner unit in one of the file storage regions as an image file;

a printer unit that prints an image data file stored in one of the file storage regions;

an access password input device that receives an input of an access password;

an access control information acquiring unit that acquires access control information indicating an access password to be inputted for accessing to a file stored in a file storage region in the case where a region access password is set for the file storage region;

an access controller that controls access to a file stored in a file storage region, based on the inputted access password and the access control information; and an access control information updating unit operable when different region access passwords are set for accessing a first file storage region and a second file storage region, respectively, to update the access control information so that the file that has been moved or copied to the second file storage region can be accessed using at least one password that could be used to access the file in the first file storage region after the file stored in the first file storage region has been moved or copied to the second file storage region.

* * * * *